United States Patent [19]

Sears et al.

[11] Patent Number: 6,115,482
[45] Date of Patent: Sep. 5, 2000

[54] VOICE-OUTPUT READING SYSTEM WITH GESTURE-BASED NAVIGATION

[75] Inventors: James T. Sears; David A. Goldberg, both of Boulder, Colo.

[73] Assignee: Ascent Technology, Inc., Boulder, Colo.

[21] Appl. No.: 09/176,999

[22] Filed: Oct. 22, 1998

Related U.S. Application Data

[63] Continuation-in-part of application No. 08/930,156, filed as application No. PCT/US97/02079, Feb. 11, 1997, abandoned.
[60] Provisional application No. 60/063,135, Oct. 22, 1997, provisional application No. 60/068,713, Dec. 29, 1997, and provisional application No. 60/011,561, Feb. 13, 1996.

[51] Int. Cl.[7] .................................................. G06K 9/00
[52] U.S. Cl. ........................ 382/114; 382/103; 382/173; 348/62
[58] Field of Search ...................... 382/103, 173, 382/177, 114; 348/62; 235/472; 345/173, 157

[56] References Cited

U.S. PATENT DOCUMENTS

| | | | |
|---|---|---|---|
| D. 287,021 | 12/1986 | Johnson ..................................... D16/1 |
| 3,676,938 | 7/1972 | Trehub ..................................... 35/35 A |
| 4,520,501 | 5/1985 | DuBrucq ..................................... 381/48 |
| 4,793,812 | 12/1988 | Sussman et al. ........................ 434/116 |
| 4,972,501 | 11/1990 | Horyu ........................................ 382/53 |
| 5,091,865 | 2/1992 | Yamada et al. ........................... 395/153 |
| 5,165,897 | 11/1992 | Johnson .................................... 434/113 |
| 5,168,531 | 12/1992 | Sigel ......................................... 382/48 |
| 5,186,629 | 2/1993 | Rohen ....................................... 434/114 |
| 5,222,160 | 6/1993 | Sakai et al. .............................. 382/57 |
| 5,223,828 | 6/1993 | McKiel, Jr. .............................. 340/825 |
| 5,233,333 | 8/1993 | Borsuk ..................................... 340/731 |
| 5,287,102 | 2/1994 | McKiel, Jr. ........................ 340/825.19 |
| 5,306,152 | 4/1994 | Shimoda ................................. 434/114 |
| 5,374,924 | 12/1994 | McKiel, Jr. ........................ 340/825.19 |
| 5,438,630 | 8/1995 | Chen et al. ............................. 382/159 |
| 5,461,416 | 10/1995 | Bettinardi ............................... 348/62 |
| 5,475,399 | 12/1995 | Borsuk .................................... 345/130 |
| 5,633,674 | 5/1997 | Trulaske et al. .......................... 348/63 |
| 5,687,333 | 11/1997 | Dobashi et al. ......................... 395/336 |
| 5,736,978 | 4/1998 | Hasser et al. ............................ 345/173 |
| 5,875,428 | 2/1999 | Kurzweil et al. ....................... 704/260 |

OTHER PUBLICATIONS

Linvill, "A Direct Translation Reading Aid for the Blind", Proceedings of the IEEE, Jan. 1966, pp. 40–52.

Vanderheiden, Boyd, Mendenhall, Jr., & Ford, "Development of a Multisensory Nonvisual Interface to Computers for Blind Users", Proceedings of the Human Factors Society 35th Annual Meeting—1991, pp. 315–318.

Converso & Hocek, "Optical Character Recognition", Journal of Visual Impairment & Blindness, Dec. 1990, pp. 507–509.

Optacon II System Brochure, Date Unknown.

*Primary Examiner*—Matthew Bella
*Attorney, Agent, or Firm*—Robert G. Crouch; Holland & Hart LLP

[57] ABSTRACT

An optical-input print reading device with voice output for people with impaired or no vision in which the user provides input to the system from hand gestures. Images of the text to be read, on which the user performs finger- and hand-based gestural commands, are input to a computer, which decodes the text images into their symbolic meanings through optical character recognition, and further tracks the location and movement of the hand and fingers in order to interpret the gestural movements into their command meaning. In order to allow the user to select text and align printed material, feedback is provided to the user through audible and tactile means. Through a speech synthesizer, the text is spoken audibly. For users with residual vision, visual feedback of magnified and image enhanced text is provided. Multiple cameras of the same or different field of view can improve performance. In addition, alternative device configurations allow portable operation, including the use of cameras located on worn platforms, such as eyeglasses, or on a fingertip system. The use of gestural commands is natural, allowing for rapid training and ease of use. The device also has application as an aid in learning to read, and for data input and image capture for home and business uses.

33 Claims, 6 Drawing Sheets

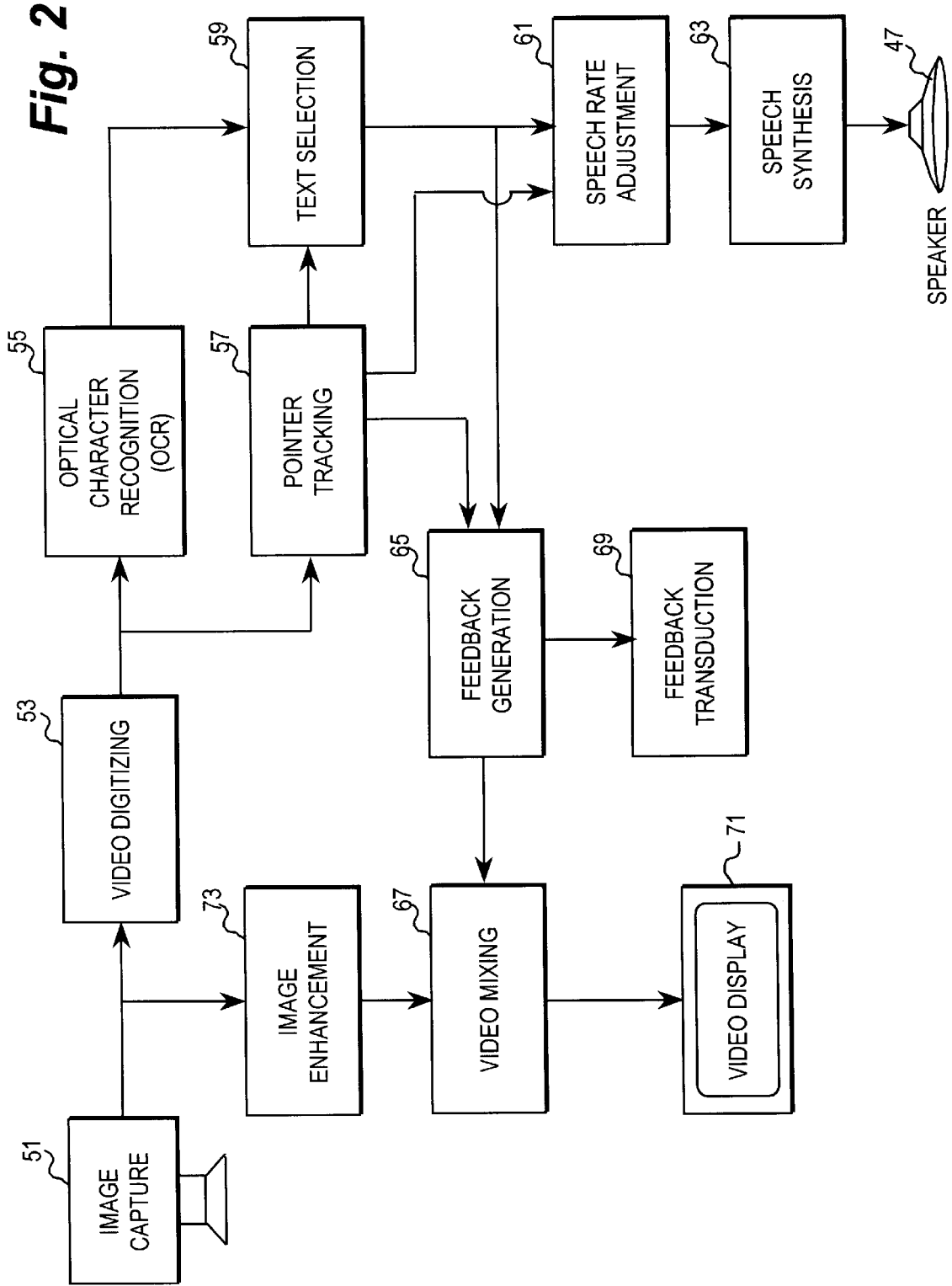

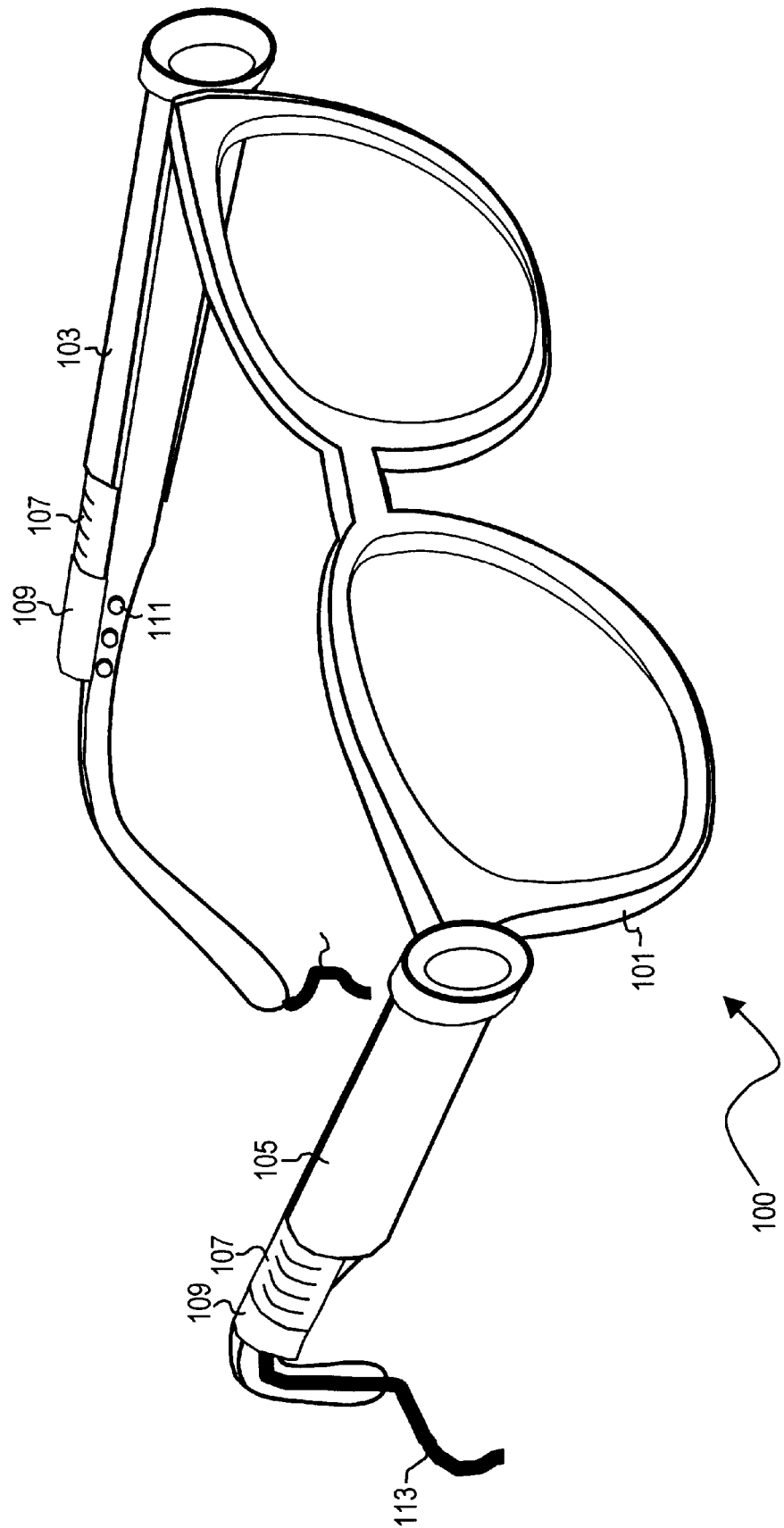

VOICE-OUTPUT READING SYSTEM WITH GESTURE-BASED NAVIGATION

CROSS-REFERENCE TO RELATED PATENT APPLICATIONS

This application is related to and claims priority from U.S. Provisional patent application Ser. No. 60/063,135, filed Oct. 22, 1997, titled "Voice-Output Reading System with Gesture-Based Navigation," and from U.S. Provisional patent application Ser. No. 60/068,713, filed Dec. 29, 1997, titled "Voice-Output Reading System with Gesture-Based Navigation," the contents of each which are incorporated herein by reference. This application is also a Continuation-in-Part of co-pending U.S. patent application Ser. No. 08/930,156, filed Oct. 9, 1997, titled "Tactilely-Guided, Voice-Output Reading Device", which is incorporated herein by reference, which claims priority from U.S. Provisional patent application Ser. No. 60/011,561, filed Feb. 13, 1996, which is a 371 of PCT application Ser. No. PCT/US97/02079, filed Feb. 11, 1997.

TECHNICAL FIELD

The present invention relates to an electronic reading system for converting text to synthesized speech that may be used by low-vision and blind people, as well as others that have difficulty reading printed text, and more particularly relates to an electronic reading system that includes improved functionality for allowing the user to navigate within the text.

BACKGROUND ART

Our daily lives are filled with the need for reading printed material at any time and in any place. Utility bills and mail at home, food labels at the supermarket, clothes labels at the department store, textbooks at school, manuals and reports at work, and menus at restaurants are but a few examples. Nearly 10 million people in the United States have visual impairments which prevent them from reading books or the newspaper, even with the assistance of reading glasses, contacts or magnifiers, and millions more have mental and learning disabilities that severely limit their reading. To these people, their inability to read these materials in the places they are encountered puts them at a severe disadvantage.

Electronic reading machines using computer-based optical character recognition (OCR) have been used since the late 1980's to assist these reading-impaired people. In general, electronic reading machines have comprised personal computers outfitted with computer scanners, optical character recognition software, and computerized text-to-voice hardware or software. Currently, machines are sold by a variety of companies, including Telesensory of Mountain View, Calif., Arkenstone of Sunnyvale, Calif., and Kurzweil Educational Systems of Waltham, Mass. In general, the operation of these systems involves placing text on a scanner and obtaining a pixel bitmap of the page to be read, converting that image to text using an OCR program in the personal computer to which the scanner is attached, and generating speech output of the interpreted text using a text-to-speech software program. In order to navigate through the text on the page, the user either presses keys on the computer keyboard or keys on a special keypad in order to skip forward or backward by word, sentence or paragraph, repeat a section, or otherwise move through the formatted text.

These reading machine systems, unfortunately, suffer from a variety of operational insufficiencies that limit their effectiveness. For instance, before the reading machine can begin to read a page, the user must typically wait over a minute. This delay is due primarily to three causes. Firstly, scanning a page is a mechanical action that takes time to move the electro-optical components over the page. Secondly, the large amounts of information in the scanned image require time to be transmitted to the computer. Thirdly, optical character recognition of an entire page can take considerable time. Thus, if a user wanted to scan through a newspaper or a magazine, considerable time would be needed simply to wait for the each page or scanned sections of text to process to the extent that it could begin audibly reading the text.

Another insufficiency of conventional reading machines is that scanners are limited in the size of page they can process, and reading a newspaper page would require multiple passes through the scanner. Furthermore, the keypad navigation of current reading machines requires that the user move through the text in the same order in which the computer organizes the data. At best, the user can skip over some paragraphs quickly, but the way in which the user is forced to apprehend the data is in the same linear fashion that the computer stores the information. This difficulty is less important in most books, in which the information is largely along a single narrative track, but can be quite limiting with highly formatted text such as newspapers, magazines, scientific journals, bus schedules, utility bills, and advertisements.

The majority of vision-impaired individuals have some residual vision, and many of these people use electronic magnifiers instead of OCR-based electronic reading machines. These magnifying systems generally consist of an electronic video capture system (usually with a CCD camera) connected to a video display. The book to be read is placed on a mechanical tracking mechanism beneath the video capture system, and assists the user in moving the book horizontally so as to keep the current line of text within the field of view of the camera. Means are generally provided to the user to adjust the contrast of the image, invert the colors of the image, and adjust the focus through manual controls on the face of the magnifying systems.

Because people with residual vision feel empowered using their remaining vision, and because they can use the magnifying systems to see information that is outside the scope of reading machines (e.g. seeing graphics on a page), and because they are generally less expensive than electronic reading machines, magnifying systems currently enjoy a far larger market than electronic reading machines. The are a large number of such magnifying systems currently available, including ones from Telesensory of Mountain View, Calif., Magnisight of Colorado Springs, Colo., and Optelec of Westford, Mass. However, conventional magnifying systems suffer from a number of problems.

For example, the mechanisms for tracking lines of text are often difficult to use, since they are manually-guided mechanical systems that require relatively precise and steady hand movements to guide the movement.

This requirement is difficult for certain people, especially the elderly who have fine motor problems, but also because it involves cognitive feedback control at the same time that considerable effort is being devoted to interpreting the images on the screen. Furthermore, when short columns of text are being read, the user must engage in frequent control of both vertical and horizontal mechanical guiding systems. Also, because of the small field of view of the camera and the limited movement of the mechanical system, the page must often be repositioned on the mechanical guides. Because of the small field of view of these systems, it is difficult for the user to understand the overall structure of text and graphics on a complexly formatted page. In addition, the system depends entirely on the user's vision, even though this vision may be adequate only for very slow reading. Yet furthermore, the image manipulations afforded by these systems (e.g. contrast, brightness, zoom and focus) are generally limited, since they depend on mechanical systems and analog electronics, rather than the much greater range of possible effects of a digital system.

It was our intention to solve the problems of the prior art, both with regards to OCR-based electronic reading machines as well as electronic magnifying systems, that gave rise to the current invention.

SUMMARY OF THE INVENTION

It is an object of this invention to provide a system to permit users to designate text to be read and to specify control system parameters through manual gestures.

It is also an object of the present invention to provide a system with both magnification and reading capabilities.

It is in addition an object of the present invention to provide a system that is affordable.

It is another object of the present invention to provide a system that allows a user to easily and rapidly select for reading text sequences that are distributed across widely separated regions of the current page.

It is additionally an object of the present invention to provide a system that allows a user to read from highly formatted pages of text.

It is still another object of the present invention to provide a system that reads text very shortly after the text is placed in the view of the system.

It is further an object of the present invention to provide a system that can be easily used from a seated position.

It is also an object of the present invention to provide a system that allows a user to read text from a large page, such as that a newspaper.

It is still further an object of the present invention to provide a system that is easy to learn to operate.

It is yet another object of the present invention to provide a system that can be used by people with difficulties in fine motor control.

It is additionally an object of the present invention to provide a system that can read text printed in a wide variety of formats on a wide variety of substrates, including medicine bottles, food packaging, and informative signs, as well as paper.

It is a yet further object of the invention to provide a device that can have many applications in daily life, including enabling reading-disabled people to read, helping children learn to read, and as a data input device for home and office.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for electronically reading text under interactive control by a user. The method includes obtaining a digital image that includes text to be read, performing symbology recognition on the digital image, determining a command signal from a sequence of user-generated spatial configurations of at least one pointer, choosing a subset of the recognized symbology to read on the basis of the determined command signals, and converting the chosen subset of recognized symbology into a humanly perceptible version.

The present invention is also directed to an electronic reading apparatus for converting text to spoken words for a user. The apparatus includes a digital imaging device that converts text to a digital imaging signal, and a character recognizer receptive of the digital imaging signal, the recognizer generating a recognized character signal comprising the symbolic identity of the recognized text and the location of the recognized text relative to the digital imaging signal. The apparatus also includes a pointer that is operated by the user to indicate commands, wherein commands are encoded in the location and movement of the pointer, and a pointer tracker receptive of the pointer location and movement, the tracker generating a pointer location and movement signal. The apparatus further includes a command interpreter receptive of the pointer location and movement signal and the recognized character signal, the interpreter generating a command signal, and a controller receptive of the command signal and the recognized character signal, the controller generating an output signal representative of at least portions of the text recognized. In addition, the apparatus includes a transducer receptive of the output signal for converting the output signal to a humanly-perceptible form.

BRIEF DESCRIPTION OF THE DRAWINGS

FIG. 1b is a perspective view from below of the camera mount depicted in FIG. 1a.

FIG. 2 is a flow diagram of the steps of information processing of the device of FIG. 1a.

FIG. 4 is a perspective view of a device incorporating the third embodiment of the present invention.

FIG. 5c is a front view of the device of FIG. 5a.

BEST MODE FOR CARRYING-OUT THE INVENTION

Overview of the First Preferred Embodiment

Figure 1B:
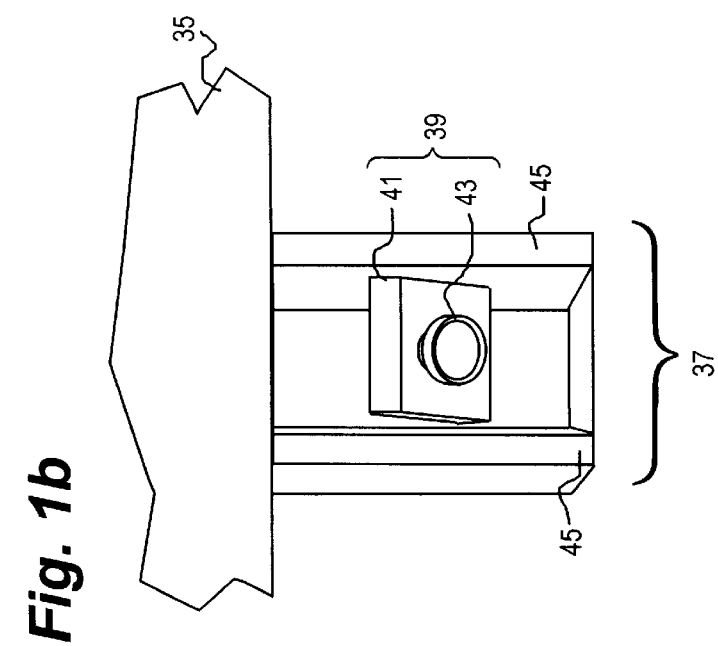
Figure 1A:
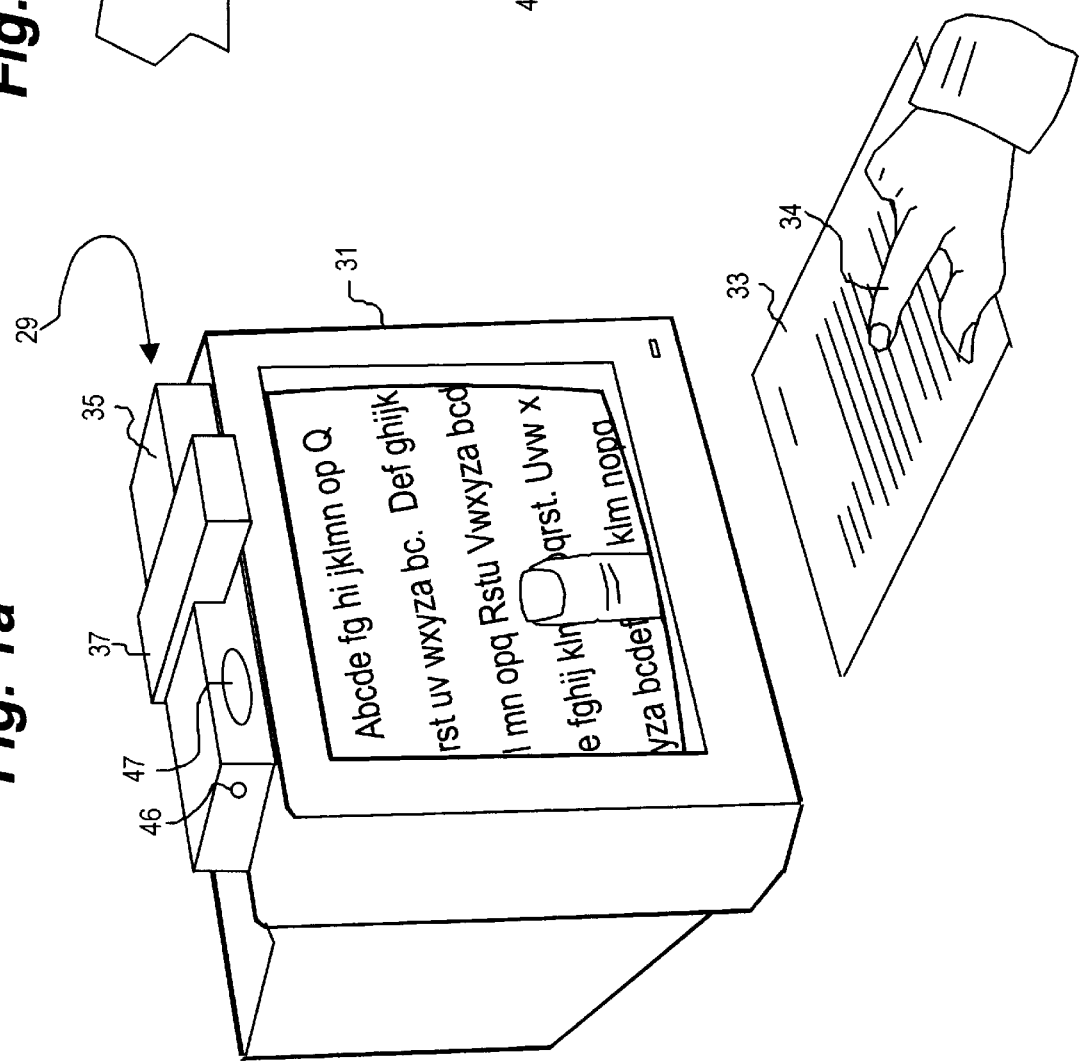
FIG. 1a is a perspective view of a device incorporating the first embodiment of the present invention.

FIG. 1a is a perspective diagram of the first preferred embodiment of the present invention. The electronic reading machine 29 is mounted on top of a video monitor 31 with the field of view onto the surface below on which printed material 33 is placed. The printed material 33 can be text in a variety of formats on a variety of substrates, including books, magazines, newspapers, food packaging, medicine bottles, bus schedules, utility bills, or CD-ROM labels. The electronic reading machine 29 comprises a main system 35, from which a camera mount 33 protrudes. The camera mount 37 comprises one or more electronic imaging devices (such as CCD or CMOS 35 cameras).

A view of the camera mount 37 from the underside is shown in FIG. 1b, a perspective diagram. A camera 39, which may comprise a CCD or CMOS imaging sensor 41 along with an attached lens 43, is angled away from the main system 35, so that it is directed towards the printed material 33.

Optionally, the camera mount 37 may incorporate one or more illumination sources, so as to provide constant illumination over the field of view. In FIG. 1b, such illumination is provided by two rows of illumination sources 45 along the lateral edges of the mount 37. These illumination sources 45 may comprise rows of LEDs, thin fluorescent sources (such as T1 lamps often used as illumination for backlit displays on portable computers), or may be other sources including incandescent sources. Optionally, these illumination sources 45 may be combined with reflectors behind the source and may also be optionally combined with focusing lenses, which may comprise Fresnel optics or lenses, to provide relatively even illumination on the surface of the printed material 33. Additionally, diffusing means may be optionally included, in order to provide for even illumination on the paper. It should be appreciated that the arrangement of illumination sources need not be in rows, as shown in FIG. 1b, but may also comprise point sources or sources located in varied arrangements around the camera 39. In general, it is convenient to juxtapose the illumination source and camera, so that any shadows thus formed by the illumination source will be minimized or absent in the image formed by the camera assembly.

The image or images obtained by the camera 39 are transmitted to an electronic computing device located within the main system 35. The device may comprise either a general-purpose personal computer, or an embedded computer optimized for use in the reading system. The computing device processes the images in order to optimize the contrast and brightness of the image, and then further processes the image in order to extract textual information (e.g. by optical character recognition (OCR)) or to interpret graphical information.

FIG. 2 is a flow diagram that depicts the use of the system described in FIGS. 1a and 1b for reading text on the printed material 33. The user places printed information into the field of view of the camera assembly, comprising the image sensor 41 and lens 43. During an image capture step 51, the image is read by the image sensor 41, and is then converted to a digital signal and processed during video digitizing 53. The output digital image, consisting of a two-dimensional array of pixel values (generally either 8-bit gray-scale or 24-bit color) is then sent to a digital computer where the image is analyzed in at least two modes. In the first mode, the image is converted into its text representation in an optical character recognition step 55, whereas in the second mode, the image is analyzed for the presence, orientation and movement of a pointer object (e.g. a finger 34, shown in FIG. 1) which is under the influence of the user and which is located on top of the printed material 33, in a pointer tracking step 57. It should be understood that the pointer that is being tracked in the tracking step 57 may alternatively comprise an object attached to a finger or hand, such as a colored dot or a blinking light, or may be an object held by the user, such as a wooden, plastic or metal rod, which may have passive or active markings to make it more easily tracked.

The combined results of optical character recognition 55 and pointer tracking 57 is both a text representation of the printer material 33, as well as an indication of the text to be read from the pointer tracker 57. As to be described below, the user indicates the text to be read through pointer gestures, that might include presenting his finger 34 in a particular orientation, forming a distinctive shape with two or more fingers 34, waving his finger 34 back and forth, or tapping his finger 34 at a location. During pointer tracking 57, the movements of the pointer are interpreted, and the text that is indicated to be read is determined.

This text to be read is converted to speech during speech synthesis 63. In general there will be a prior or concurrent step of speech rate adjustment 61, during which time the rate of speech will be adjusted according parameters such as pointer movements detected during pointer tracking 57, user preferences, the difference in the location of the pointer and the location of the text currently being read, and other parameters.

In addition to determining the text to be read, pointer tracking 57 also supplies input to a step of feedback generation 65 through a step of feedback transduction 69, which is used to indicate to the user information other than the vocalized text on the page supplied through the steps of text selection 59, speech rate adjustment 61, and speech synthesis 63. This feedback comes in a variety of different forms. For instance, sounds could be used to indicate whether the printed material 33 was oriented properly, whether the paper 33 needed to be moved in order to place additional text within the field of view of the image sensor 41, or the manner in which the pointer 34 is aligned with respect to existing text (e.g. whether it is pointing at text or not).

Many users of the system will have residual vision that can be used to supplement the synthetic speech output from speech synthesis 63 and feedback transduction 69. The images captured during image capture 51 are fed through image enhancement 73, which can improve image readability using analog or digital enhancement techniques such as increasing contrast, changing the image brightness, emphasizing edges, inverting color polarity (e.g. from black on white to white on black), changing the bit-depth (e.g. from gray-scale to black and white through binarization), or the like. This image may be combined in a step of video mixing 67 with an overlay of feedback information, which could include placing a box around the text currently being vocalized. The combined signals are presented then to the user in a step of video display 71.

Detailed Description of the First Preferred Embodiment

The step of image capture 51 can involve either color or black and white images. The advantage of color images is balanced by the higher data throughput required to transmit the image to the computing device present within the main system 35. Either CMOS or CCD sensors may be used for the image sensor 41, and are selected on the basis of cost, pixel density, noise and other variables. The image sensor may communicate through various means with the main system 35 computer, including parallel, universal serial bus (USB), IEEE 1394, or 16-bit (PCMCIA) or 32-bit (CardBus) connections, or through a special frame grabber which integrates directly with the system bus, preferably with a direct memory access (DMA) interface (e.g. Matrox Meteor cards from Matrox, Montreal, Canada). The choice of communications interface is made on the basis of cost, throughput, and DMA capabilities.

The main system 35 computer should be of sufficient power to perform the remaining steps of the process. In general, any Intel Pentium or compatible chip of 150 MHz speed will be sufficient, although a faster speed will provide improved results. In addition, other non-Intel processors, such as those that are used in Windows CE systems, will suffice if they are of a similar performance. While Windows 98 and Windows NT 4.0 operating systems are suitable for system operation, other operating systems such as Windows CE are also suitable, if support programs for functions such as optical character recognition and speech synthesis are available.

It should be understood that the computer of the main system 35 may be part of a separate system, such as an office or home desktop computer. The use of such a general purpose computer greatly reduces the cost of a system of the present invention. Thus, only the imaging system and certain feedback output systems to be discussed later need to be provided to the user, and the main computing functions of the desktop computer (processor, power supply, motherboard functions, etc.), as well as input from microphones and output from speakers and video displays integrated with the computer can be used.

The number of pixels to be obtained during image capture 51 is determined by the size of the area to be read, and the requirements of the optical character recognition (OCR) program. In general, the higher the pixel density, the better the accuracy of the OCR. It is preferred to have a pixel density of 125 pixels per inch (dpi), which is slightly less than most facsimile (FAX) machines, although pixel densities of 300 dpi or better provide even better OCR accuracy. In order to reach this pixel density, the image sensor 41 must have a sufficient number of pixels, and the optics of the lens 43 must allow a small FOV at short operating distances.

The DVC-323 digital camera from Kodak (Rochester, N.Y.) has minimal but sufficient operating characteristics for the present invention. The camera operates in "still" mode, capturing images of 640 by 480 pixels with a "macro" image size of 4.7 by 3.5 inches, translating to about 140 dpi with the standard lens. The camera transfers the image to the host computer via a USB connection. It should also be noted, and will be discussed later, that the DVC-323 may also be operated in a video mode wherein the pixel density is lowered to 320 by 240 pixels, or less, in order to facilitate faster transfer of images through the USB connection.

Video digitizing 53 includes analog-to-digital conversion, if it is not an integral part of the image sensor 41 (many CMOS sensors include integral analog-to-digital converters). Once the image is transferred to the main system 35, it can be digitally manipulated to make the input more appropriate for subsequent interpretation. For example, the signal may be converted from a color image to a gray-scale or binarized black-and-white image, since many OCR programs operate most effectively on such images. In addition, the image may be gain adjusted, despeckled, and otherwise manipulated to improve the image for subsequent processing.

The optical character recognition step 55 is carried out in the main system 35 using standard OCR algorithms, such as those employed by the Tiger program of Cognitive Technology of Corte Madera, Calif. These programs not only convert the image to its text representation, but also identify the location of particular letters, the font sizes and styles used, and basic text formatting such as indenting and paragraph margins.

The pointer tracking step 57 operates using commonly used tracking algorithms. While many pointers may be used, it is most convenient for the pointer object to be part of the users hand, since it is always available, it is easily placed in the vicinity of the printer material 33, and fingers and hands are naturally used to point at objects, and have ranges of both large scale and small scale motion appropriate for that task. More specifically, for purposes of this description, the use of one or more fingers of the user's hand will be used as illustration of pointer tracking and basic gesture-based navigational commands, as shown using the finger 34 of FIG. 1.

Since, for the most part, the printed material will be roughly stationary, changes in the image will be linked to movement of the finger 34. These changes can be easily identified using means of comparing without the finger 34, and with the finger 34 present. In general, as the printed material 33 is placed under the camera mount 37, the printed material 33 can be seen free from the presence of the finger 34. To assist in this, the user may be verbally instructed to keep their fingers and hands from the area under the camera mount 37 until an identifying sound (e.g. a "beep" emitted from a speaker 47 on the main system 35) indicates that they may place their hands within the field of view of the image sensor 41. Then, when a new image is subtracted from the original image of the printed material 33, most of the difference image will be blank, except for the presence of the finger 34.

Figure 6:
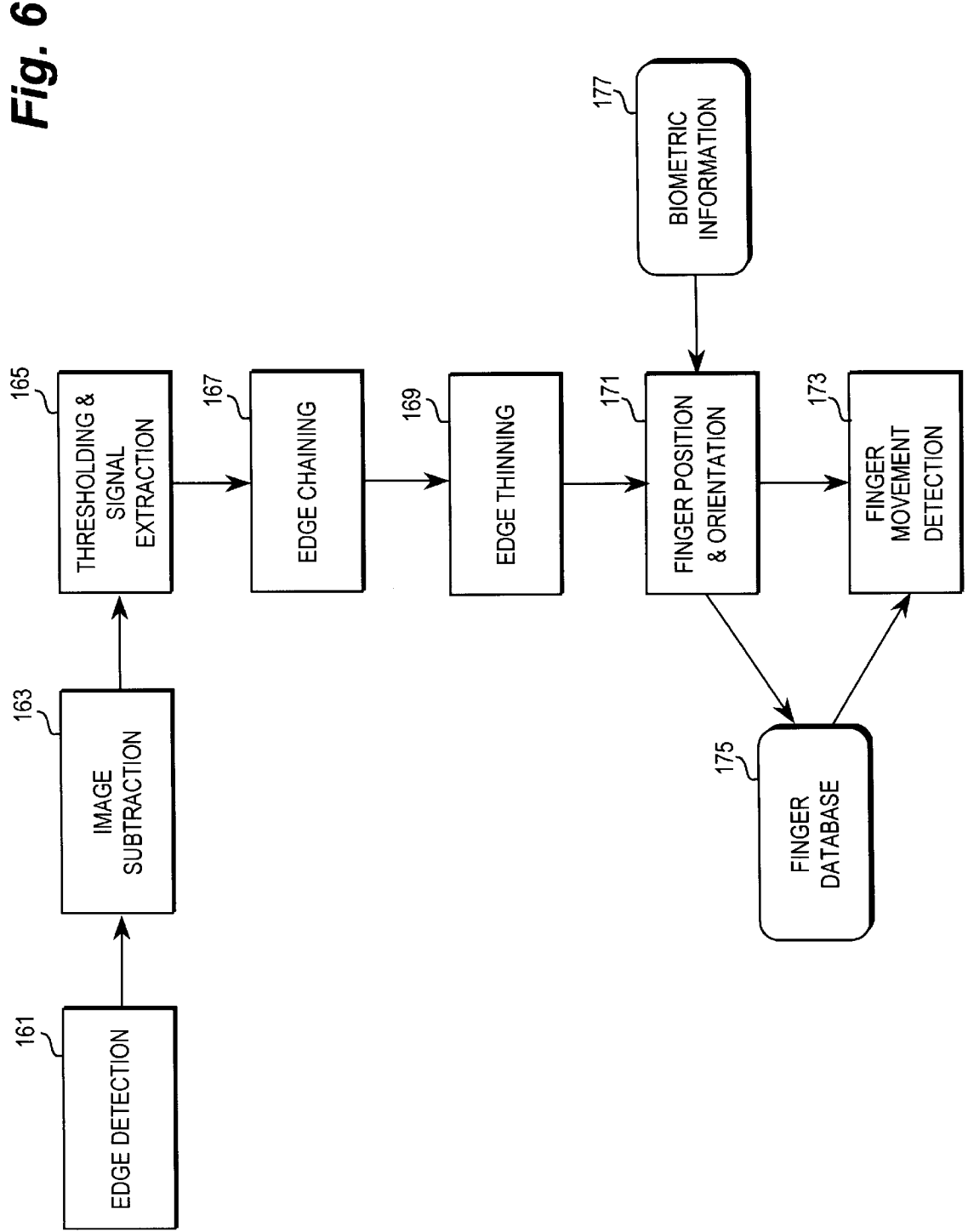
FIG. 6 is a flow diagram of the steps of pointer tracking, as used in the flow diagram of FIG. 2.

FIG. 6 is a flow diagram of the steps of an alternative method of pointer tracking 57, in this case for tracking a finger. The input to a step of edge detection 161 is the digitized video image from video digitizing 53. Edge detection finds large positional changes in pixel value, which may be performed by convolving the image using multipoint edge enhancement operators, or by simpler arithmetic manipulation of adjacent pixels. This edge enhanced image is then subtracted from a similarly edge enhanced image of the sheet without the finger, taken before the finger is placed into the field of view, in a step of image subtraction 163. This image should have small amounts of noise due to changes in illumination and movement of the printed material 33 that occurs between the time that the two images were taken. Therefore noise, determined by both the magnitude of the residual pixel information, as well as its degree of localization, is removed in a thresholding and signal extraction step 165. In addition, the continuous values present until this point are converted into binary (black versus white) values through thresholding. Individual pixels are now grouped together into lines in an edge chaining step 167, using an algorithm that looks for increasing variance of points around a line, until the variance exceeds a predetermined threshold. This groups all of the pixels into a smaller number of discreet lines, which are easier to handle in later steps. Because thicker lines are resolved by edge detection 161 into parallel lines along each edge, an edge thinning step 169 looks for such parallel and closely spaced lines, and resolves them into a single line, generally at the midpoint.

Now the image has been reduced to lines representing the current position of the pointer, and in a step 177, these lines can be compared with biometric information 177, which indicates norms for finger length, width, and the like. From these comparisons, finger position and orientation can be established. The current finger information is stored in a finger database 175, sorted on the basis of time. In particular, while the index finger 34 may be inserted to varying degrees within the field of view of the image sensor 41, its width should be roughly between 12 and 25 mm in width, whereas two fingers 34 should be between 30 and 50 mm in width (it should be noted that these widths ranges do not overlap). Thus, it is possible to easily distinguish between one and two fingers 34 placed on the printed material 33, and by extension, between two fingers 34 and an entire flat hand on the page.

The current finger information is then compared with past finger position and orientation in a finger motion detection step 173, in order to determine the motion of the finger over time. For example, if the finger travels first in one direction and then the other direction over a period of one-half a second, a wagging motion of 2 hertz would be returned.

If a color camera 39 is employed, the finger 34 could be identified on the basis of its color in distinction with the color of the background-printed material 33. This would still require an initial detection of the finger in order to determine the skin color for later use, but this could happen in a calibration stage where the finger 34 is brought in front of a white background. In operation, the pointer tracking 57 could look for colors with the known hue of the finger, and use this to determine the location of the finger 34.

It should be appreciated that there are many algorithms that may be employed for the detection of the presence, location, orientation and movement of the finger 34, and the algorithm of FIG. 6 is only an indication of a method that will provide the necessary information. Other algorithms may be more accurate or consume less computing resources or have other advantages over the method given.

Tapping motions by fingers 34 can be readily detected by a variety of means. For instance, the apparent width of the finger 34 slightly increases as it is raised, and then decreases as it is lowered. In a subtraction of successive images, this is seen as an outline difference of the finger 34, especially since the finger 34 will not be moving in general directly in the direction of the image sensor 41. In addition or alternatively, as the finger 34 is raised, depending on the orientation of illumination sources, it casts a shadow on the paper that is visible as a darkened area. Also, in addition or alternatively, as the finger 34 is raised and lowered, while the overall shape of the finger 34 is retained, the detailed distribution of skin features and nail position will move a large amount relative to their size making it easy to see.

On any sheet or object containing textual information, there is considerable content to be read. The user selects the textual components to be read by the system by pointing with his hand at the text to be read. The position and movement of the pointer finger 34 is combined with the location and presence of the text on the printed material 33 in order to select specific text to be read in the text selector step 59. The finger 34 locator defines a "reading window" comprising text that is contextually related. For instance, text within a paragraph is more closely related than text in a prior or succeeding paragraph. Text in the same column generally has (except for tables) a closer relationship than text in adjacent columns.

When the user points to text, the text within the reading window, determined by the text selector 59 through input from the OCR step 55 and the pointer tracking step 57, comprises that text to be immediately read, and is linked to text to be successively read. The user indicates through gestural movements the manner in which the text is to be read. For example, text may be read continuously, either at a fast or slow rate, single lines or paragraphs of text may be read, words may be spelled out, paragraphs may be skipped, etc. The gestural movements interpreted by the text selector 59 allows the user fine control over the reading behavior.

For example, moving one finger 34 back and forth sideways over text may indicate that the text should be read continuously. Tapping on the text may indicate that only a single line of text should be read. Curling the finger up (bringing the fingernail vertically under the hand) could indicate that a paragraph of text should be skipped. The placement of two fingers on the page without movement could indicate that reading should temporarily halt.

It may be useful to read individual text elements, such as words or numbers, when the user cannot understand these elements as spoken by the reading system, when the user wishes to repetitively vocalize certain speech, or when the user wishes to vocalize individual text elements (such as page numbers). In such cases, the user may make a short horizontal stroke rightward along the text underneath the element to be vocalized. The lack of continuous horizontal or vertical motion would indicate to the system that an individual element is to be vocalized.

It should be understood that the gestural movements could be used not only to select the text to be read, but also the manner in which the text output should be generated, or other parameters of the electronic reading process. For instance, the speed with which the single finger 34 moves back and forth across the page, as described above, could be used to determine the rate at which synthesized speed is read. Alternatively, or in addition to this speech rate control, the user could move his finger 34 down the page through the text, and the system would adjust speech rate in order that the current speech output would be approximately at the text which is in front of the finger 34. Spreading two fingers apart (e.g. the index finger and thumb) could be used to set the auditory volume of speech output. A closed fist could be used to direct the electronic reader to shut itself off.

Using gestural methods such as these, the step of speech rate adjustment 61 sets a rate of speech output. In addition to the gestural inputs described above, the system will also use other information, such as a predetermined default rate, generally chosen from the range of 80–160 words per minute, which may be user selected, as well as range limits beyond which speech recognition by the user will be challenging.

A set of gestural movements along with the command interpretations constitutes a gestural user interface. One such interface would comprise the following gestures and commands. One or more fingers moving back and forth would constitute a clear command, stopping any current reading. To read the whole page, 4 fingers would be laid on the printed material 33 until reading begins, where such reading could be stopped with the clear command as described above. To magnify a section of text, the user would put his thumb and index finger together to form a "C". The section between the fingers defines the location and field of view of the image obtained by the camera 39. Moving a single finger horizontally across a page reads the text in the line above the finger at a rate such that the vocalized texts keeps pace with the movement of the finger; moving the finger vertically reads the single word in each line closest to the finger as the line is passed by the finger. Moving a double finger (two fingers extended side-by-side) vertically through the text reads the text at a rate whose speed is roughly proportional to the speed of the hand, but which has lower and higher predetermined rates which may not be exceeded. Moving a triple finger (three fingers extended side-by-side) vertically through the text reads the text at a rate "without limits", reading at the speed that the fingers move. If the speech synthesis cannot keep up with the rate of finger movement, words or lines are skipped and replaced by short beeps or clicks to indicate that information was skipped.

In the preceding discussion, we have described a number of gestural movements that can be distinguished by processing of visual images by a computer (e.g. one, two or more fingers placed flat, wiggling one or more fingers left to right, tapping a finger, curling a finger inwards, making a fist, etc.), as well as commands which the user wishes to make with these gestures (e.g. read the text above the finger, move to the next block of text, read the text faster, read more loudly, stop reading, remember this text). The particular linkage of a gesture with a command may be cognitively linked—e.g. a flat hand, like a "stop" motion, may be used to stop reading. However, many different gestures may be linked with different commands within the spirit of the present invention. Furthermore, the gesture-based commands may be supplemented with physical controls (such as buttons, knobs, sliders and keyboards) to allow other modes of input.

In step 63, the speech selected in text selection 59 will be synthesized at a rate determined by speech rate adjustment 61. The means of synthesizing speech may include both software and hardware components. A preferred method of speech generation would use software programs such as Lernhout & Hauspie's Text-to-Speech (Burlington, Mass.). The output speech is encoded by the speech synthesis software in an appropriate format, such as 16-bit linear PCM encoding, and then output through a speaker 47 (see FIG. 1) located on the main system 35. If the user wishes for more privacy when operating the system, a jack 46 is provided into which headphones may be inserted.

It is important for the user to know where text is located on the page. This not only allows the user to knowledgeably select which text to be read, but in addition, by perceiving the spatial layout of textual information, thereby gain information about the type of textual content on the page. For example, listings, tables, graphics, utility bills, restaurant menus, and other textual information commonly encountered in daily living have characteristic layouts with important encoded information.

The locational information is provided to the user by way of feedback means, which may comprise tactile, audio and visual feedback, or a combination of these different modalities.

Tactile—The tactile feedback mechanism may comprise a worn, held or sub-surface (below the printed material 33) transducer that vibrates in response to the presence of textual information within the reading window. In the case of a worn transducer, the transducer may be attached or clipped to the tip of the finger. Vibrating pins or rotating eccentrics would generate the skin deflection associated with a tactile feeling. The held transducer may be cupped or grasped within the user's hand that is directing the reading process (i.e. on which the finger locator is based), and includes similar vibration means as for the worn device described above. The sub-surface transducer comprises one or more vibratory transducers which is located beneath the surface of the textual information. For instance, a raised reading platform could be placed within the field of view, delimiting the extent of the field of view, and additionally incorporate tactile feedback means that transmits tactile feedback through the reading material. The tactile feedback means incorporates movement transducers that may be cam-based, eccentric-based, magnetic-based, electro-rheologically based, or other such mechanisms that can provide different vibration vectors (e.g. shear vibrations in different directions, pressure vibrations or physical displacement).

Information is provided by the tactile means through the presence or absence of vibration, the intensity of vibration, the frequency of vibration, the periodic timing of vibrations, and the direction of vibration. Combinations and variations of the vibrational characteristics can thereby convey information about the density of text (e.g. lines per inch), the size of the text font, closeness of the locator finger to the text direction of the closest text outside of the reading window, alignment of the text relative to the horizontal of the camera assembly image, and other such information as is useful to navigate through textual information. For instance, if there is no text within the reading window, a characteristic pulsing vibration would indicate nearby text, and the frequency and intensity of this pulsing vibration would guide the user to the text. In addition, characteristic vibratory patterns can indicate when the reading window is positioned over graphics. The use of tactile information to guide the user in reading is also described in PCT patent application PCT/US97/02079 to Sears, titled "Tactilely-Guided, Voice-Output Reading Device," which is incorporated herein by reference.

Alternatively, or in addition to tactile feedback through vibration, a finger-mounted tactile unit may produce displacement of a movable member underneath the tip of the finger locator, giving the perception to the user that their finger is moving over a topologically elevated text. Thus, as the finger moved over a line, the member would push up on the finger from below, raising the finger, and giving the impression that the line of text was raised relative to the surrounding surface. Thus, by moving their finger over the entire surface, the user would receive rapid, intuitive and spatially encoded information about the distribution of text element over the page. In addition to encoding text location by perceived elevation only, the mechanical actuator may also provide physical tilt to the perceived elevated component. For example, the physical actuator may have two vertical actuator elements beneath an inflexible, relatively horizontal cross-member. As the height of the two vertical actuator elements changes, the slope of the joining cross-member will change, resulting in the perception of slope. This reinforces the perception described previously in this paragraph of traversing up and over an elevated line of text, which in actuality is flat.

If a tactile feedback mechanism is attached to the user's finger 34, this provides a convenient platform for means to locate and track the finger. For example, a blinking LED facing upwards towards the image sensor 41 may be placed on the tactile transducer housing, wherein the blinking is synchronized with image capture 51 such that during successive image captures, the LED is on and then off. By comparing the two successive images, the location of the finger can be easily tracked.

Audible—The audible feedback means includes the generation of sounds of various volumes, frequencies, timbres, repetition frequency and directional source location (with the use of multiple speakers and techniques to produce three-dimensional holographic sound, such as that provided from SRS 3D Sound from SRS Labs of Santa Ana, Calif.) that conveys information such as that described for tactile feedback means. For instance, if there is no textual information within the reading window, the frequency and/or intensity of a sound can increase as the finger locator is brought closer to readable text. In addition, spoken information may be used to guide or inform the user. For example, the word "graphic" can be enunciated to indicate the presence of graphical information. Simultaneously, perceptually distinctive background sounds can indicate the density of graphical information (e.g. keyed to the spatial frequencies within the graphic or the distribution of color densities).

Visual—Many potential users of this system have complete vision, yet have trouble reading (e.g. the learning disabled, dyslexic, or alexic), or have low vision where acuity is insufficient for reading common printed text sizes. In such cases, the residual vision may be well employed to guide the user through the text information. In such cases, the system would incorporate either a monitor (such as a computer display or television screen) or alternatively, a visual display that might comprise a bank of LEDs, a liquid crystal display or scanned laser beams projected onto the printed material 33.

In the case of a high-resolution monitor, the image of the printed material is presented to the user. This image may be enhanced by affecting the brightness and contrast of the image. In addition, a magnified view of the image around the reading window may be called upon through a signal input by the user. This signal may be input either by a pressure-sensitive button attached under the tip of the finger locator, or alternatively, may be a visual gestural cue interpretable by the computer. For instance, the thumb and index finger may be spread apart to indicate the desired horizontal or diagonal extent of the field of view in the magnified image. In the case of closely spaced text, that text which is currently within the reading window may be indicated through changing the text color or by highlighting the text which comprises the reading window. The image displayed on the screen need not be real-time captured by the camera assembly, including the finger locator, but may be derived from a previously captured image in which the finger is not present, so that a clean image of just the source reading material is displayed. Alternatively, the image of the user's finger may be replaced with an icon representing the finger locator, a box representing the reading window, or a muted image of the finger locator that allows viewing of the image beneath the finger.

If the visual feedback means is a visual display that does not directly project pixel images from the camera input, then that display may be located on the directing finger or hand, or may be at a fixed location, such as being incorporated into the camera assembly housing. Location on the directing hand allows the user to simultaneously view the material being read, as well as the visual feedback information. A preferred embodiment of this form of visual feedback means would be a pair of rows of LEDs, operating similarly to the tactile display pins and lights described in PCT patent application PCT/US97/02079 to Sears titled "Tactilely-guided voice-output reading apparatus." However, instead of the LEDs being pointed back towards user, as in the patent application referenced above, the lights would preferably by pointing forwards, illuminating the text currently in the field of view that is to be vocalized.

Control for this feedback is provided in a feedback generation step 65, which accepts input from pointer tracking 57 and text selection 59, which contain information about the position and movement of the finger 34, as well as the location of text elements on the printed material 33 and the text elements being read. The feedback so generated is provided through feedback transduction 69, via either tactile, audible or visual signals as previously described. In addition, output may be through a step of video display 71, in forms of visual feedback as previously described, such as the highlighting of certain text. In general, this video feedback is performed in conjunction with display of images from the step of image capture 51, and thus may require a step of video mixing 67 of the original video images with the images of feedback generation 65. Alternatively, the digitized video images from the digitizing 53 may be digitally altered in the feedback generation 65, and then provided as digital images for video display 71.

It should be noted that an important and challenging feedback is to allow the user to follow a single line of text. That is, if the finger locator were to move diagonally across the page, and the reading window were to follow closely, a single contiguous line of text would not be read. Thus, it is important to either give feedback information to the user, to allow their finger locator to track a contiguous line of text, or to incorporate user input that directs the reading system to automatically track text parsed into sentences and paragraphs. This is accomplished according to the present invention in two different ways.

Firstly, the feedback device, whether tactile, audible or visual, or a combination of these, can direct the user how to move their finger locator along the text line of which the current reading window is a part, which we will call here the "track line." With such means, feedback is given to the user to indicate when the finger locator is moving off of the track line. For instance, the intensity and/or frequency of tactile or audible feedback can peak when the finger locator is located precisely below the track line, and drop off in intensity and/or frequency in rough perceptual proportion to the distance from the current track line. With a visual feedback means, the icon representing the finger locator may change in color, size or intensity depending on the distance of the finger locator from the track line. In these ways, the user can be directed to maintain the same track line as their finger traverses horizontally, instead of skipping to a new line.

Alternatively, or in addition to the feedback described in the preceding paragraph, the user may direct the reading system to read according to parsed textual content. That is, that the reading system will read blocks of contiguous text at a preset rate until some selection delimiter is reached. This selection delimiter may either be intrinsic to the text (such as the end of a paragraph), or it may be bounded by a cue provided by the user. For instance, the user may direct the system to provide continuous speech through the use of two fingers instead of one, and stroke the fingers vertically along the section of the text to be read. When the reading system reaches the end of the delimited section, an audible cue (such as a beep) indicates that the user should further instruct the system as to the next selection.

In addition to the hand-position and movement signals mentioned above, there are numerous input signals that may be required from the user. For example, as mentioned above, input from the user may be obtained from pressure-sensitive buttons located beneath the tip of the locator finger. Alternatively, or in addition, buttons may be available in a unit accessible to the free hand on which the finger locator is not located. This keyboard may include positional navigation keys (such as arrow keys), contextual navigation keys (e.g. "next word" or "previous paragraph" keys) or mode selection keys (e.g. "read continuously" or "check spelling" keys). Alternatively, or in addition, a microphone on the main system 35 may be positioned so as to receive vocal input from the user, which allows the user to select different modes of action or to navigate through the computer interpreted text using spoken commands.

It should be noted that electronic cameras have limited resolution, set by the number of pixel capture elements and by the communications bandwidth for transmitting images from the image sensor 41 to the main system 35. Because of the large area of most pages of text, the resolution of the imaging device may be less than optimal for interpretation of the image by a conventional optical character recognition software program. There are other limitations of these OCR programs and images input to these programs, including lighting, contrast, tilted text, page distortion (e.g. page buckling as the user runs their hand over the page), smudges on the text, colored text or background, and more. It is useful for multiple images of the reading material to be obtained and interpreted by the OCR program. For instance, images can be obtained under different exposures, which alter the thickness of lines in the text. In addition, given the distance of the image sensor 41 from the text, vibrations on the surface on which the reading machines or the printed material 33 are placed will cause very slight changes in the placement of text within the pixel image, which will generate different OCR solutions. Such multiple images allow the OCR program to sample the text under slightly different conditions, some of which will aid in improving the accuracy of text interpretation by the OCR program of at least some subset of the text. Letters interpreted from different images of the same text selection may be compared on the basis of confidence factors generated by the OCR program, by spelling programs, or by context analysis (e.g. grammatical checkers). Successive analyses using these factors can be incorporated into increasingly accurate interpretations of every portion of the reading material in the field of view, even before it is called on by the user to be vocalized. This allows the reading system to operate with camera resolutions and inadequacies in reading material quality that would otherwise not be able to be tolerated.

In order to provide systems with large fields of view, using inexpensive cameras of small size, multiple cameras with partial overlap may be used. For example, with the DVC-323 camera previously mentioned, the field of view in macro mode is 4.7 by 3.5 inches, providing a resolution near the lowest possible for optical character recognition. Four cameras arranged in a rectangular arrangement with minimal 0.2 inch overlap in their fields of view would provide a composite field of view of 9.0 by 6.6 inches, which is adequate to cover a standard 8.5 by 11 page with 1 inch margins. Additional cameras or cameras with higher pixel counts could cover even larger fields of view.

It is understood that this invention could also be used for machine translation of text from one language to another. Thus, when presented with a book in a foreign language, the apparatus and methods of the present invention would allow a person to hear the text in their native language. Language translation would occur after the OCR program interpretation of the captured image into text input. Because the entire image from the reading material is input prior to vocalization, the computer may correct for syntax and other language construction differences in order to create proper speech in the native language of the user (this is opposed, for instance, to word-by-word translation, which would be a separate option). In addition, or alternatively, the text and images captured by the system of the present invention can be used to input the text and images for storage and use on the main system 35 computer. This might be used, for instance, as a low-resolution scanner and text input mechanism for general application by users who may or may not have a disability.

For example, home or business users can make manual gestures to copy portions of letters, bills, and advertisements into computer storage files the designate. The advantages over existing scanner systems such as PaperPort system produced by Visioneer (Freemont, Calif.) is that localized portions of pages may be classified independently, that valuable desktop surface is not consumed with a bulky scanner, the system of the present invention may be used while sitting at a work desk, and that the time required for scanning is not required. The user, for example, can open the letter, visually scan it for pertinent data, manually gesture for the data to keep, speak into a computer voice recognition system to indicate the disposition of the data, and then dispose of the letter.

Furthermore, for a portable system of the present invention, to be described later, a user in a warehouse could point to a bar code to read. The system, using a digital image instead of a conventional laser scanning bar code reader to obtain printed information, would then read the one-dimensional or two-dimensional bar code, and enter it into the system. Because the user would not need to hold a bar code scanner in his hand, this would permit more efficient two-handed movement in the inventory system, and thereby permit increased speeds of data input.

An Alternative Embodiment of the Present Invention

Figure 3:
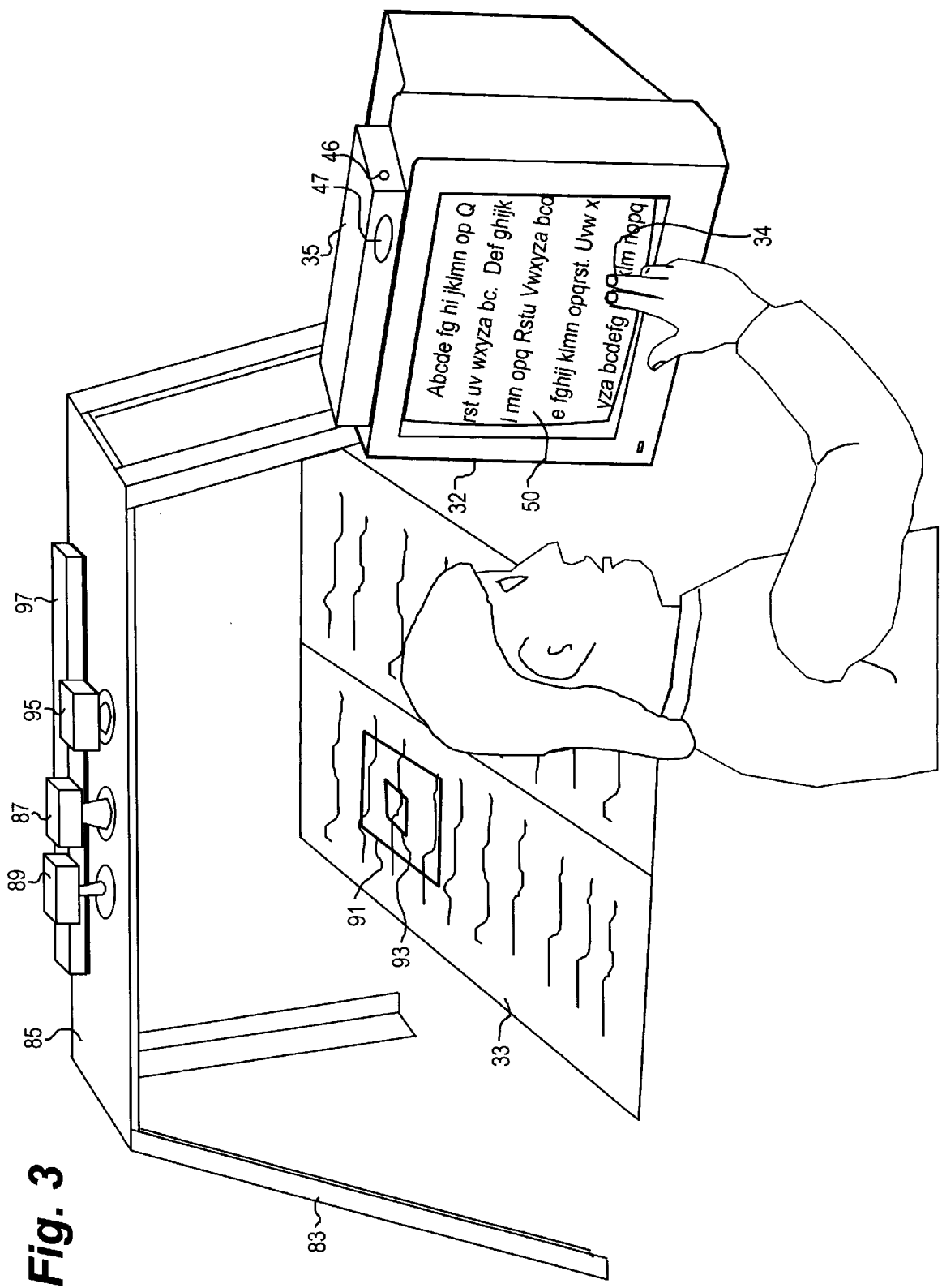
FIG. 3 is a perspective view of a device incorporating the second embodiment of the present invention.

FIG. 3 is a perspective diagram of a reading machine that incorporates two cameras. A multiplicity of legs 83 supports a platform 85 over the printed material 33 to be read. A low-magnification wide-angle FOV camera 87 is used to track command gestures. This camera 87 may be fixed in its orientation, provided that the field of view is sufficiently large to capture images from the entire printed material of interest. In order to provide a sufficient FOV, the camera 87 may be outfitted with a wide-angle lens that may have a constant non-linear distortion (e.g. a barrel or fish-eye effect). In this case, software within the computer would be required to remove this constant distortion. In the figure, the extent of the field of view of the fixed wide-angle camera encompasses the entire printed material 33. This range may be large enough to allow an entire unfolded page of newspaper to be read without repositioning of the paper.

In this embodiment, a pan-tilt camera 89 is provided with a generally smaller FOV than the wide-angle camera 87 previously mentioned. This camera 89 may or may not be outfitted with zoom capability, and if the camera 89 does have zoom capability, the range of magnifications needed will be more limited than in a single camera embodiment, since many low-magnification requirements are satisfied by the low-magnification wide-angle FOV camera used to track command gestures. In the figure, the extent of the field of view of the pan-tilt camera is shown by the area 91 on the printed material 33. This area is of such a size that the pixel density on the imaging sensor of the camera 89 allows for accurate optical character recognition of text in the field of view.

Optionally, a laser scanning mechanism 95 can be mounted in such a way as to be able to illuminate small sections of all printed material to be read. The purpose of the laser scanner 95 is to highlight the words being read and spoken, providing feedback to partially-sighted users as to what is currently being read. The scanning mechanism 95 is controlled to produce an illuminated box 93 around or fully including the current word being read. In this way, the user can ensure that the process is detecting the proper words for reading. In order that the scanning illumination not interfere with optical character recognition, the laser scanning may be timed so as not to overlap in time with the exposure of the cameras 87 and 89. It should be understood that instead of highlighting single words, larger sections of text representing sentences or paragraphs may alternatively be highlighted. In addition, the word or words of interest may be shown on a display screen, as described previously for other embodiments of the present invention, in order to provide feedback to users. It should be understood that this laser scanning mechanism 95 could also be used other reading systems such as that of FIG. 1.

Furthermore, the laser scanner 95 may have the additional function of highlighting text that is searched for under direction from the user. For example, the user may direct the system to search for a specific word such as "pay" or for classes of words or text, such as those dealing with currency (e.g. text preceded by a currency symbol such as '$', which involves a number with two decimal digits, or which contains the word "dollars", or alternatively to scan for non-text symbology such as a bar code or location encoded data such as the page number, which is located in generally predictable locations on a page). When the system successfully detects the search text, then the text could be illuminated by the laser scanning mechanism 95.

In order to limit the range of motion or illumination required by the laser scanner 95, it may be affixed to the pan-tilt mechanism of the high-resolution camera 89, so that the laser is always pointing roughly in the direction of the camera 89 field of view. In this way, the laser scanner 95 will need a smaller range of motion.

Additional illumination of the text to be read is provided by a wide-field illuminator 97, which is mounted on the platform 85 near to the location of the cameras, and pointed in such a direction as to illuminate text beneath the platform 85. The range of the illuminator 97 is such as to provide light that is incident on the widest physical range accessible by both the wide-field and pan-tilt cameras 87 and 89. In FIG. 3, the wide-field illuminator 97 is a fluorescent lamp with reflector and optics to spread the light roughly evenly over the largest field of view of the wide-field camera 87.

The pan-tilt mechanism of the camera 89 should preferably be oriented so that movement along either the pan or the tilt axis scans horizontally across the printed material, roughly following a text line, while movement in the other axis scans roughly vertically across the page. While this orientation of the camera 89 is not required, it will generally reduce the amount of complex combined pan-tilt movement as text in a line is read. It should also be understood that the mechanism pointing the camera may be served by gimbal mechanisms different from pan-tilt mechanisms, as long as accurate control in two-dimensions is available, and that a sufficient range of motion is provided. Instead of moving the camera 89, it is also within the spirit of the present invention to rotate one or more mirrors, while the camera 89 remains fixed in location and orientation.

It should be emphasized that the two cameras 87 and 89 may be replaced by a single camera with zoom capabilities. In reading text newly placed under the camera, the camera may be in low magnification zoom, where large areas of the page can be observed within a frame. In this low magnification mode, the camera can scan the observed page for control signals in the form of user hand signals or motion. During this time before the user has indicated a command, the camera may scan both horizontally and vertically over the area of the page looking for the presence of the user's hand.

Once the user's hand or finger is identified using algorithms previously described, the hand can be tracked until a command is received, either through hand movement, finger orientation or position, or other input modality. At this point, the magnification of the camera is increased to an extent that allows the text to be reliably interpreted by the OCR program. Thus, the zoom mechanism will magnify large font headline text to a lesser extent than small fonts, for example in a footnote.

As the magnification of the camera increased, the amount of light reaching the image sensor 41 will be decreased. A light mounted on the camera assembly, which is oriented in the direction of the camera field of view, may provide additional illumination whose intensity can be variably increased as the magnification of the zoom element of the camera increases. The actual control of the illumination source intensity is through feedback involving analysis of the images captured by the camera. Alternatively, the exposure time of the camera can be increased in response to changes in the magnification in order to compensate for the available light at different magnifications.

It should be noted that the coordinated action of the cameras 87 and 89, as well as the laser scanner 95 are preferably controlled by the computer located in the main system 35 that is engaged in the analysis of images from the camera. Thus, all of these elements are generally, though not necessarily, connected electronically to the main system 35, which may be located on the platform 85. Additionally, instead of being separately mounted to the platform 85, as shown in the figure, the elements will likely be placed within a common housing.

The zoom camera is particularly valuable if the image captured by the camera is projected on a computer screen, since the hardware zoom can present a magnification with full pixel information to the user, without need for variable software magnification, which may be of lower quality due to the use of smaller numbers of pixels.

It should be noted that the operation of the system with multiple cameras could admit many different sequences of optical character recognition (OCR) 55 and pointer tracking 57. For example, when printed material 33 is placed within the field of view of the image capture 51 means, OCR 55 may begin immediately, before gestural input from the user has begun. Image capture 51, video digitizing 53 and OCR 55 may proceed opportunistically given text within the field of view, and if the gestural command directs the system to read text already interpreted, vocalization of the text through speech synthesis 63 can begin almost immediately. If the text to be read is not among that already interpreted, then image capture 51 of the indicated text using high pixel densities suitable for OCR 55 can begin. This mixing of optical character recognition 55 and pointer tracking 57 can be performed by a single camera with zoom capabilities, changing rapidly from narrow to wide field in order to both capture text and gestural commands, but the use of two cameras allows high resolution text capture to occur simultaneous with low resolution, wide field image capture 51.

In addition, because images of the text to be read may be already captured before gestural commands are interpreted, the reading system can read text that is obscured by the user's hand during gestural commands. For instance, if the system has begun reading a passage, and the user inadvertently covers some of the text to be read with his hand, the information under his hand may already be stored. Thus, not only can text vocalization continue, but also images of the text where the user's hand is currently placed can be shown in video display 71, even though current unobscured images of the text are not available.

Optionally, the user may view the text on a video display, similar to that used in the first embodiment. FIG. 3 shows the use of a touch-screen video display 32, which may be alternatively used. With the touch screen display 32, instead of making the gesture-based navigational commands within the field of view of the imaging system, the commands are placed directly via finger 34 movements on a touch-sensitive surface 50 of the touch-screen video display 32. The touch-sensitive surface 50 can use capacitive, resistive, surface acoustic wave or other techniques to determine the presence and motion of fingers on the screen, such as resistive digital touch screens manufactured by Jayco of Orange, Calif. While these surfaces 50 generally allow feedback of a single point, and are therefore generally incapable of interpreting the differences between a single finger and multiple fingers used gesture-based commands, even the use of a single point allows the system to distinguish left-right versus up-down motion, tapping motions, and even back-and-forth motions from moving, lifting, returning, and moving motions. This provides a vocabulary of motions that can be used in commanding the system. Instead of having to interpret images for gesture-based commands, the system must interpret only the presence or absence of touch contact, and the motion of this point of contact. In the future, when touch screens are able to completely describe multiple points of contact, then the use of more complex gesture-based commands involving multiple fingers and even the orientation of repose may be used with such a system.

When using the touch-screen display 32, the text within the system field of view is presented on the touch screen 32, and the user indicates by gesture-based commands not only the text to read, but the manner and speed of reading, as well. Because the user interacts with an image, rather than the actual printed material 33, only a single view is permitted at a time. This encourages the use of a single camera with pan, tilt and zoom capabilities, rather than the multiple cameras shown in FIG. 3. The user can control the pan and tilt by appropriate command gestures on the touch screen 32 (e.g. dragging a finger in the direction of panning, or "drawing" a circle of smaller or larger radius to increase or decrease the zoom), or the system can automatically track lines of text through OCR-based motion control. It should be noted that the image shown on the screen need not necessarily be the current field of view of the currently active camera, but may be instead a stored image, allowing the cameras 87 and 89 to be capturing images of the printed material 33 for later reading.

Using a touch screen display 32, the user may interact with text that is modified in the step of image enhancement 73, which may render it more visible to users with residual vision than the printed material 33 from which the text comes. This enhancement may include, as previously discussed, contrast and brightness control, and the image may be further modified by highlighting certain text (such as the text or text line currently being read).

It should be noted that operation using a touch screen display 32 even allows for the use of a flat-bed scanner to obtain images of the printed material 33, with the user providing gesture-based commands through the touch screen display 32. This mode of operation has the virtue of using inexpensive flatbed scanners, but suffers from the difficulty of using scanners described in the background section above. Most importantly, scanners require up to a minute or more to scan a standard page of text, whereas image capture using digital cameras supports near immediate reading once the printed material 33 is placed in the field of view of the system.

Another enhancement of this embodiment of the present invention is to import images for optical character reading directly from the screen image buffer of the computer of the main system 35. Consider, for example, that the computer of the main system 35 is connected to the World Wide Web graphic interface to the Internet (hereinafter referred to simply as the Web). Much of the text interface to the Web is graphic in nature—that is, is presented as pixel images of text, rather than as text which is displayed through Hypertext Markup Language (HTML) text primitives. Web interface software (e.g. Web browsers) typically are unable to provide access to this graphics based, non-HTML text to vision-impaired or blind users.

It is within the teachings of the present invention to access a screen image buffer of the computer of the main system 35, which contains a pixel image of the screen, as the equivalent of the digitized image output of video digitizing 53, for use in optical character recognition 55. This allows text to be read both from normal HTML text primitives, as well as from graphics images downloaded from the Web, making all text accessible to vision-impaired users in spoken form. In order to adjust the pixel density of the images for use in OCR 55, the settings of the video display in the graphics memory of the computer could be variably set, using user-adjustable controls such as is found in the Display settings of the Control Panel in the Settings menu in the Windows 98 operating system from Microsoft Corporation of Redmond, Wash.

The system preferentially operates in hybrid mode, where text displayed in HTML-code is directly interpreted from the code, whereas text displayed as graphics is interpreted through OCR 55 of the present invention. The reason for this is to avoid the need to OCR-interpret text whose symbology is already known to the system.

The user could input gestures for navigating through this text in many ways. One method would be to use a touch screen display 32, in which the position touched by the user is directly mapped onto the pixels beneath the user's finger. The effect then becomes directly comparable to that of the user making gestural commands on printed material 33, except that the text is present on a screen rather than paper. An alternative method of interfacing with the screen-based text is to use the cameras 87 and 89 to record gestural movements made within their field of view, without respect to material beneath the gestures. That is, there may or may not be printed material 33 within the field of view of the cameras 87 and 89, and what is there is ignored by the system. Instead, the system maps the position of the user's fingers within the field of view, and maps the location of the hand and fingers relative to the field of view to the relative positions of recognized text from the screen image in the field of view. Thus, if the user's index fingertip is about 12% from the left of the field of view, and 47% from the top of the field of view of the wide-angle camera 87, the system would treat it as if it were on top of whatever text was 12% from the left of the screen and 47% from the top of the screen of the displayed text, irrespective of the printed material (if any) beneath the user's hand. This latter method has the advantage of being able to interpret a wider range of gestures (e.g. those involving multiple fingers, or the orientation of fingers) than can be interpreted by most conventional touch screen displays.

This embodiment of the present invention may also be used as a reading device for children, both for its entertainment effects as well as educational value. A child user who could not currently read would bring their favorite children's book to the system of the present invention, and place it in the field of view of the system. The system could not only read the book for the child, but also highlight words as they are being spoken through use of the laser scanner 95, thereby providing feedback to the child useful for gaining the ability to read.

A Third Embodiment of the Present Invention

Smaller versions of this embodiment may be created to scan single book pages, still within the spirit of the present invention. A smaller reader would be particularly useful for a portable version of the device. In this case, the platform 85 may be supported on collapsible or hinged legs, or may even be available in forms without leg supports, and be worn by the user. For example, the cameras, illuminators and scanners, or some subset of these, may be worn on a head-mount, such as on a pair of glasses, telephone headset, headphones, or cap.

An example of such a worn reading machine is shown in FIG. 4, a perspective diagram of an eyeglass reading machine 100. An eyeglass frame 101 provides the basic platform for the reading machine. A wide-field camera 103 on one eyeglass earpiece provides functionality similar to that of the wide-field camera 87 of FIG. 3, and a narrower field camera 105 provides functionality similar to that of the pan-tilt camera 89. Suitable cameras for this embodiment of the present invention include the DXC-LS1 lipstick camera from Sony (Japan).

On each earpiece, more proximal to the ears, is a speaker 107 which provides audible feedback to the user, which may be stereo encoded. For instance, to direct the user to turn their head to the right thereby repainting the cameras 103 and 105 fields of view, a noise may be fed through the right speaker. This audible feedback is supplemented or replaced by tactile feedback transducer 109 that vibrates one or more pins 111 on the inside surface of the earpiece, against the bones above the ear. The power and communications are brought to this reading machine 100 through a pair of cords 113 that feed along the earpiece. These cords can be incorporated into an eyeglass support (not shown) that lies along the back of the user's neck, preventing the eyeglass reading apparatus from dropping. The cords 113 lead to a computer that may be carried in various means, including backpacks, hip packs, shoulder bags or an article of clothing such as a vest.

The major functional difference between this embodiment and that described in FIG. 3 above is that the narrow-field camera 105 does not require a pan or tilt capability, and thus the user must point the camera at the proper area on the page in order for the field of view of the camera to be properly placed. This requires continuous and rapid feedback from the system, either through audible feedback from the speakers 107, or tactile feedback through the tactile transducers 109. Optionally, these feedback means may be supplemented by a laser pointer on the eyeglass oriented so that its light falls near to or directly on the center of the field of view of the narrow field camera 105. This will allow users with residual vision to identify the field of view of this camera 105, and thus track lines of text. If combined with a pan and tilt mechanism, this laser could also be used to highlight text on the page in the manner of the laser scanner 95 in FIG. 3 above.

It should be noted that this embodiment of the present invention leaves the hands of the user free to hold and manipulate the text, and also to perform the gestural commands described above. Also, because of the portability of the device of FIG. 4, it may also be used to interpret text not located on printed material brought to the system, but rather may also include text on public signage, computer screens, directions affixed to a wall, or book covers on a library shelf, to which the reading apparatus has been brought. The ability to read such text will be conditioned by either a variable focussing means or through use of a camera with a very great depth of field (e.g. a "pinhole" camera), so that text at various distances can be read.

A Fourth Embodiment of the Present Invention

An alternative embodiment of the present invention is to have the camera assembly mounted on the user's hand, as in a portable system. In the previous embodiments of the present invention, the camera or cameras capturing the images of text to be read are either at a fixed location, or located relatively distantly from the text (e.g. mounted on the user's head or chest). Furthermore, in these embodiments, the camera received commands, at least in part, from hand and finger gestures of the user that were captured by the camera or cameras.

Figure 5C:
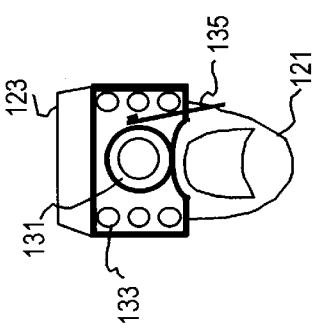
Figure 5A:
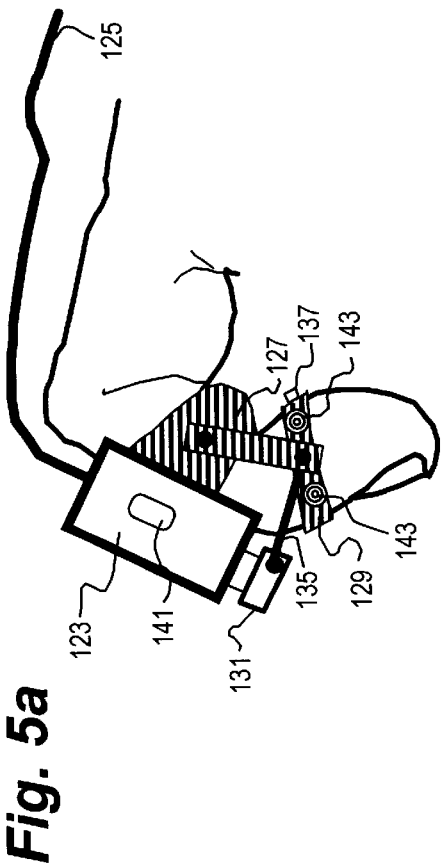
FIG. 5a is a side view of a device incorporating the fourth embodiment of the present invention.
Figure 5D:
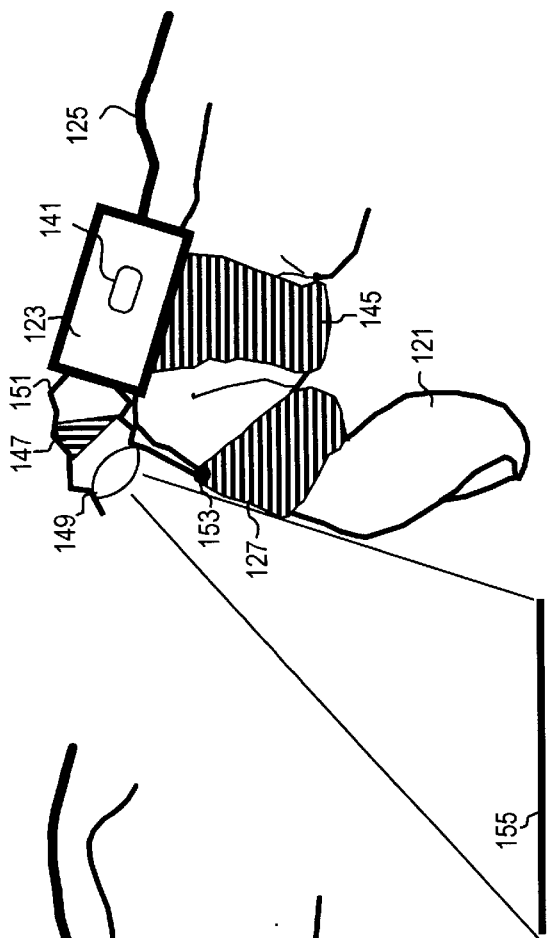
FIG. 5d is a side view of a variation of the device of FIG. 5a, with a cut-away view of the lens system.
Figure 5B:
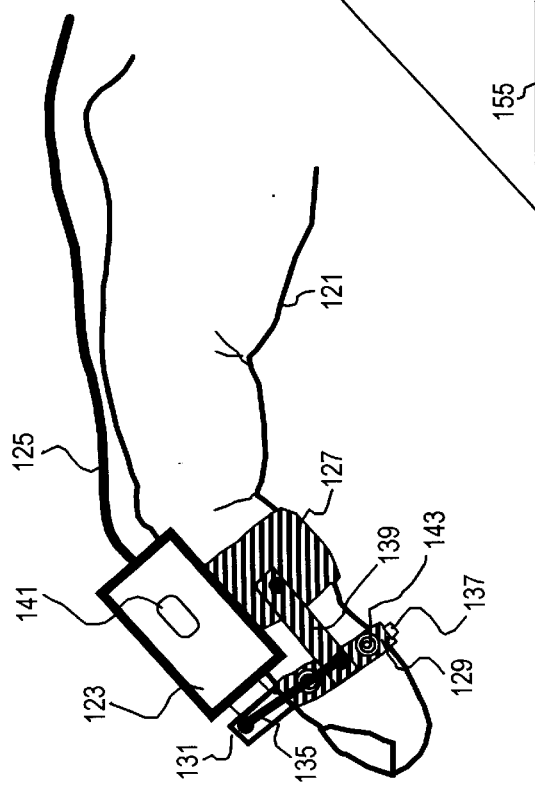
FIG. 5b is a side view of the device of FIG. 5a, with the finger in a different configuration.

FIG. 5a and FIG. 5b presents side views of a fourth embodiment of the present invention, and FIG. 5c presents a frontal view of the device. In this embodiment, a camera is mounted directly on the user's fingertip 121 in a finger housing 123. When the finger 121 is pointed at text to be read, the camera in the finger housing 123 is naturally pointing in the same direction. Images are then transferred by a cable 125 connecting the finger housing to a general-purpose or special purpose computer, such as contained in the main system 35, as in the previous embodiments. The following paragraphs describe the structure and function of the finger housing 123, as well as the special algorithms used to interpret images and commands from this embodiment of the present invention.

The finger housing 123 is strapped onto the user's index finger 121 with two straps, a medial strap 127 encircling the middle segment of the index finger, and a distal strap 129 which encircles the distal segment of the index finger. The medial strap 127 is longer in the longitudinal finger direction, and is the primary structural stabilizer of the finger housing 123 on the index finger 121. The medial strap 127 is conveniently fabricated from fabric or plastic. The finger-housing 123 rests on top of the finger 121, with a lens 131 above the distal-most segment, and points along the axis of the finger 121, roughly in the same direction as the user perceives the finger to point. The camera that is part of the finger-housing 123 does not necessarily point directly in the same direction as the finger tip, but may be inclined so that the image taken by the camera is directed more vertically (i.e. with the lens pointing somewhat downward). Optionally, a supporting member 139, made of a less flexible material, connects the medial and distal straps 127 and 129, so as to provide support for the distal strap 129, as well as to maintain a fixed distance between the two straps. In order to aid in slipping the device over the finger, as well as provide a more stylish exterior, a Spandex or other fabric sheath may be placed around the finger housing 123 and associated straps 127 and 129 and supporting member 139.

Illumination is provided for the camera by illuminators 133 around the periphery of the camera, pointing the same direction as the camera, as can be seen in FIG. 5c. The illuminators 133 are conveniently light-emitting diodes (LEDs), and may be of different colors to aid in the discrimination of different colored text, or text on different colored backgrounds. In the case of different colored LEDs, the LEDs 133 would be turned on in sequence or in combination to provide illumination with the greatest contrast of text to its background. One such arrangement of LEDs is shown in FIG. 5c, although a smaller number or different topological arrangement of LEDs is within the spirit of the present invention. Depending on the aperture of the camera lens 131, the sensitivity of the camera, and the amount of ambient light expected, ambient illumination may be sufficient to provide images of the text without additional illumination from the device.

The user's finger 121 will generally be inclined to the page at an angle of greater than 45 degrees, as shown in FIG. 5a. However, because the camera is angled to the text, the captured image will not be square and will appear distorted if compensation is not made either in the optical hardware, the camera positioning or image capture software. Thus, the optical path within the finger housing 123 may include either tilted mirrors or prisms to remove some or most of the optical distortion caused by the non-orthogonal camera angle. However, these methods cannot entirely remove the non-orthogonal image, since the angle with which the user positions the camera cannot be entirely controlled or predicted, and small amounts of distortion may remain.

This final distortion may be somewhat compensated for by image processing software within the computer, which may detect the angle of the camera position by assessing various features of the image. For example, in general, the lighting from the illuminators, described above, can be known and calibrated for a vertical camera arrangement. If the camera is angled, that portion of the image that is divergent will generally also have less reflected light, since the incident light from the illuminators is spread over a larger area. Thus, the variation in illumination intensity can be used to detect spreading of the image, and provide the information necessary to remove the distortion. In order to assist in the compensation for camera tilt, a miniature tilt sensor, such as those that use a fluid sensing device, may be used to detect camera tilt. With knowledge of the tilt, the image processing software within the computer may remove the effects of tilt. Alternatively, or in conjunction with the means described above, a circular beam of light of known spread may be projected during certain image captures, and the tilt and distance of the surface can be unambiguously determined from the size and shape of the beam captured in the images. Using this method, the illumination spread angle must be different and preferably smaller than the camera field-of-view in order to distinguish distance.

Other means of determining the angle of camera tilt can include looking at the divergence of angle in vertical parts of letters, such as the vertical bars on "h", "l", "b", "K", and many other letters. If the camera is not orthogonal to the text, the angle of the vertical bars will vary within different parts of the image.

For larger text, the user may want to pull the camera away from the printed text in order to increase the field of view of the camera. Because the lens system of the camera will generally operate with a very short focal length, it is generally hard to allow the lens to accommodate a very large range of focal depth. In part, this can be accomplished by using a very small lens aperture, creating a pinhole camera with large depth of field. This strategy, however, is limited by the reduced light capturing of such a pinhole lens system, and the need to compensate for this effect with higher illumination than may be available.

Alternatively, the camera can be outfitted with a movable lens system, which provides variable focus. One example of such an apparatus can be seen FIGS. 5a through 5c, where the user changes the camera focus naturally by flexing his finger away from the text. As mentioned above, the finger housing 123 is primarily positioned and stabilized on the middle segment of the index finger 121 by the medial strap 127. As the hand is pulled away from the page and the finger 121 flexes, curling the finger into the hand, the strap 129 on the distal segment pulls a stiff actuator 135 which is attached tangentially to the camera lens 131, and thus rotates the lens 131 which is attached to the camera by a screw mechanism. Thus, the distance from the lens 131 to the camera is adjusted, thereby changing the focal point of the camera assembly.

It should be noted that a number of different mechanisms for varying the focus of the camera lens 131 are allowed within the present invention. For instance, an actuator may extend from the bottom of the lens 131 and rest on the distal finger 121 segment under the influence of spring pressure. As the finger 121 flexes, the actuator would move downward to rest on the new position of the finger 121, changing the focus.

Unlike the previous embodiments of the present invention, the camera does not capture images containing the user's finger or hand, and so images of user hand or finger gestures cannot be used directly to communicate commands to the computer. Instead, three different methods, used in isolation or in combination, are used to allow the user to issue hand-based commands to the computer. In the first case, a small button 137 may be placed on the distal strap 129 on the finger housing 123, located in such a way that when the user taps his finger 121 on the surface of the printed material, the button 137 is actuated. The electrical connections for this button may be transmitted through wires placed within the distal and medial straps 127 and 129, and the support member 139. The button 137 permits both single and double "clicking" as command inputs. For example, the user may click once to activate reading, and a second click would stop reading. Double clicking could command activation of voice input, change lighting, or indicate another function.

Alternatively, the sequences of images from the camera can indicate special finger gestures as command inputs. For example, by analyzing images captured from the camera, the camera can detect changes in illumination, and by detecting offsets of common image elements from frame to frame, determine direction and speed of finger movement. For example, if the user's finger 121 is above the page, and then brought down rapidly in a tapping motion, the illumination intensity on the page from the LEDs 133 will increase rapidly, as the lights are brought closer to the paper. Then, as the finger 121 is brought into contact with the surface of the reading material, the increase in illumination will abruptly stop.

Sideways motion can be detected by comparing contiguous image frames, comparing the locations of like elements within the frames, and then by computing the offset, compute the linear motion and direction across the page. Complex gestures could be interpreted from sequences of different finger moves. For example, consider a double-click followed by rapid movement in one direction followed by a slow return movement. If the rapid motion were in the direction of text lines, this could command the device to increase the rate of speech, whereas rapid movement in the opposite direction could command the device to decrease the rate of speech.

Accelerometers located within or on the finger housing 123 can detect and communicate the direction and magnitude of acceleration. Thus a tapping motion down would be detected as a moderate acceleration downwards, followed by a very sharp, impulsive upwards acceleration as the finger strikes the page surface and stops. Such accelerometer devices are widely available in piezoelectric, piezoresistive and variable capacitor form from companies such as Endevco of San Juan Capistrano, Calif. The use of the button, of image analysis, and of accelerometer information, or other methods of determining finger position and movement, may all be used to determine and interpret finger gestures for user input of commands to the system.

In many instances, it is useful to have an accurate method for determining the distance from the lens 131 to the printed material, in the direction of camera pointing. As mentioned above, this information may be used to determine the location and movement of the hand, for interpreting hand gestural commands to the computer. Additionally, this information might be used for an automatic focusing mechanism, in which either the camera or the lens were moved according to the dictates of the object distance. By varying the distance from the lens to the camera imaging sensor, different focal points may be accommodated.

A convenient method for determining the distance from the camera face to the reading material is the common triangulation technique used in industrial photoelectric sensors and handheld cameras. In this method, a roughly collimated beam that is co-aligned with the camera line of sight, but offset by a small distance, is projected onto the printed material. Depending on the object distance, the location of the beam contact with the printed material within the camera image will vary predictably. By measuring the location of the projected beam within the image, the distance from the camera to the printed material may be computed. In order to reliably detect the beam within a relatively complex image, the beam may be switched on and off between successive camera frames, and through the process of image subtraction, the location of the beam within the image will be easily identified.

In order to conveniently create a collimated beam, two methods are preferred. In the first, a diode laser with a collimating lens is placed within the finger housing. Alternatively, a narrow-output beam LED can be placed within a hole in the finger housing, such that a roughly collimated beam emerges from the hole. The diode laser has the advantage of a longer working distance, although the LED system has the advantage of cost and size in its favor.

It should be noted that multiple beams measuring distance, the beams being located at different radial offsets form the line of sight, can be used to additionally determine tilt and curvature of the images surface.

It should be noted that other means of communicating commands to the computer are useful, most notably verbal commands that are input to the computer using a microphone and interpreted by a voice recognition program. This microphone will generally be integrated near, on, or in the computer system to which the system is connected by cord 125. Other input may be available through one or more buttons 141 located on the exterior of the finger housing 123. These buttons may be used to "wake up" the system, when the system is in a sleep or power-saving mode, turn the system off, alert the system that audible input from the microphone is to be entered by the user, or other such commands.

This embodiment of the present invention allows most or all of the audible, visual and tactile feedback modalities described above in reference to the embodiments of the present invention described previously. Thus, for example, a tactile interface 143 could be included in the finger housing for this embodiment, and the audible and visual feedbacks can be handled by the computer in the same manner as the previous embodiments. The tactile feedback stimulators 143 on the device may be located at a number of positions within the spirit of the present invention. For example, one or more stimulators 143 may be located on the inside surface of the straps 127 and 129 used to attached the finger housing to the user's index finger. Alternatively, the tactile stimulators 143 may be located on the underside of the finger housing 123, against the dorsal surface of the finger 121. It should be understood that the sensitivity of the finger 121 varies substantially with position, and the highest sensitivity occurs on the ventral surface of the distal segment of the finger, which is the optimal location for the positioning of the tactile sensors, although other locations may suffice. For users with fall or residual vision, colored LEDs on the rear surface of the finger housing may also provide feedback information to the user.

It should be appreciated that the feedback mechanisms described here are very similar to those described for tactile feedback of the first embodiment of the present invention. Thus, the mechanisms for tactile feedback described here can be used for the first embodiment, and visa versa. For example, the function of the laser scanner 95 can be replaced with a laser scanner mounted on the finger housing 123, and highlight the words being spoken in a manner similar to that of other embodiments of the present invention.

While the finger housing 123 in FIG. 5a through FIG. 5c is shown resting primarily on the dorsal surface of the finger 121, it is within the spirit of the present invention for the finger housing 123 to be both more substantial in size, as well as encompass a wider range of circumference around the finger 121. In this case, the user's finger would insert in a hole in the device, and electronics would be placed around the finger 121. Tactile stimulators 143 would face in through the radial dimension of this device to contact the user's finger 121.

Furthermore, within the spirit of the present invention, the finger housing 123 may be located on any segment of the finger, and may be conveniently located not on the middle segment, as shown in FIG. 51 through 5c, but rather on the proximal segment, closer to the knuckle, with the finger 121 held in an orientation similar to that of FIG. 5a. FIG. 5d presents a side view of this embodiment of the present invention, in which the optics of the camera are presented in schematic cross-section. The finger housing 123 is located on the proximal finger 121 segment, secured to the finger via a housing strap 145. In the optical path of the camera located within the housing 123 is a bellows arrangement 151 (shown in cross-section) which holds a prism 147 and a lens 149. The prism 147 redirects the light from a field of view 155 near the tip of the finger to the input path to the finger housing 123. The bellows is secured to the medial strap 127 by a bellows attachment 153, so that as the finger 121 flexes, it extends and wraps the bellows 151 around the finger, rotating the lens 149 and the prism 147 so as to maintain the light path to the finger housing 123. It should be noted that the prism 147 may alternatively be a fluid-filled prism, so that as the finger 121 moves, instead of moving the prism 147, it changes the relative angle of the faces of the prism, thereby adjusting the optics in the required manner.

The placement of elements shown in FIG. 5d has a number of advantages, including a larger field of view, given the larger distance to the printed material, a larger depth of field, greater comfort (since the weight of the device is closer to the point of rotation at the knuckle, and therefore presents less torque around the knuckle), and some of the weight of the device may be carried not on the finger but over the knuckle.

Benefits and Advantages of the Present Invention

In light of these and other examples of prior art, the present invention provides a number of advantages relative to magnifying and electronic reading devices practiced in the prior art, including:

The systems may be used with general-purpose computers, which are becoming ubiquitous in office and home environments. These computer systems provide both the computing power necessary, as well as ancillary input and output devices, including video displays and audio feedback. Thus, the price of the system for the end-user who already has a suitable computer will be very inexpensive. Furthermore, as the power of these consumer and business computers rises, the performance of the reading systems will correspondingly improve.

The systems use natural gestures to control the reading machine. For instance, when children are first learning, it is natural for them to use their fingers to follow the text, and this is the same movement used in Braille text reading. The use of finger pointing and hand movements, being so common and natural, makes learning to use the system rapid. This contrasts with current reading devices, which require the user to learn and become comfortable with specialized keypads of keyboard sequences. These control gestures make the system particularly useful for teaching young children to read, since it uses gestures that are naturally used by children.

The use of pointing allows very fine control by the user of the text to be read, and allows reading of highly formatted text, such as in bills, menus, technical literature, and more. Current magnification devices require physically moving text into the field of view of the camera. This is both physically challenging to some users, and further may be difficult to do when the user can see only a small amount of the formatted text. Because the computer of the main system is generally high performance, this allows considerable "intelligence" to reside in the software program for tracking text, rather than requiring the user to track it manually.

Because the system does not need to read in an entire page before OCR and speech synthesis, as are required by current systems, text reading can begin before the system is able to obtain high density pixel images of the entire field of view. Instead, low resolution, wide field images are used to interpret gestural commands, indicating the text to be read, and the system then needs only to maintain image capture and OCR rates faster than the text can be spoken, which is generally available with systems of even relatively modest performance (for example, a 166 MHz Pentium MMX system will generally meet this criterion). Thus, instead of waiting 60 or more seconds before the first line of text can be read, as is found with most current electronic reading systems, the present invention can begin reading almost as soon as the page is placed in front of the device. Consider, for example, trying to find a particular page in a book or newspaper. With the current device, the page can be placed in front of the system, and almost instantly, the user can point to the place where the page number is always located, and know the number of the page.

The system of the present invention can be used from a sitting position, as the printed material need be placed only on the desktop, rather than in a raised scanner of current reading machines. In addition, the third (eyeglass) and fourth (fingertip) embodiments of the present invention are easily made portable, so that reading can be performed wherever and whenever printed material is encountered, whether at school, at work, at the store or at a restaurant.

Current reading machines are limited to conventional scanners, which often can scan legal-sized paper. Larger printed material, such as both pages of an opened magazine or a single newspaper page, can not be read without repeated and complex repositioning. This is particularly annoying to many users, since frequently, the entire contents of a page must be scanned when only a single article is to be read. The present invention, on the other hand, can accommodate large pieces of paper, and only that text which needs to be read is scanned. Even for systems of the present invention with a smaller field of view, in order to bring text into the field of view, it simply must be slipped into the field of view, and may be nearly instantly read.

Systems of the present invention have both magnification and reading capabilities. Because the images are dealt with digitally, as opposed to current magnification systems that generally deal with only analog signals, the signals may be enhanced and sent directly to the video display of the attached computer. Thus, for users with residual vision, they can have for prices similar or less than current magnification systems, systems that provide both magnification and electronic reading. Furthermore, the possibilities of digital enhancement of the image are far greater than the enhancement currently available with analog magnification devices.

It should be apparent to one skilled in the art that the above-mentioned embodiments are merely illustrations of a few of the many possible specific embodiments of the present invention. Numerous and varied other arrangements can be readily devised by those skilled in the art without departing from the spirit and scope of the invention.

What is claimed is:

1. A method for electronically reading text under interactive control by a user, the method comprising:

obtaining a first digital image of at least a portion of the text to be read;

performing symbology recognition on the first digital image;

capturing a temporal sequence of digital images of user-generated spatial configurations of at least one pointer;

determining a command signal from the temporal sequence of digital images;

choosing a subset of the recognized symbology to read at a spatial location on the text to be read on the basis of the determined command signal;

feeding back to the user the spatial location of the chosen subset to be read and the spatial location of at least one pointer relative to the recognized text, wherein the spatial location of the chosen subset and the pointer aids the user in selecting the text to be read; and converting the chosen subset of recognized symbology into a humanly understandable version.

2. A method as defined in claim 1, wherein the pointer is comprised of a finger on the user's hand.

3. A method as defined in claim 1, wherein a portion of the spatial configurations are comprised of the relative locations and orientations of two or more pointers.

4. A method as defined in claim 1, wherein a portion of the spatial configurations are comprised of the locations of the pointer relative to the text.

5. A method as defined in claim 1, wherein the pointer is attached to the user's hand.

6. A method as defined in claim 1, wherein the spatial configurations of the pointer are determined from the digital image.

7. A method as defined in claim 1, wherein the digital image is obtained from a means attached to the user's hand.

8. A method as defined in claim 7, wherein determining command signals comprises analyzing the relative location of text within the digital image from successive frames in order to determine the location and motion of the means of obtaining the digital image relative to the text.

9. A method as defined in claim 1, wherein a camera is used to obtain digital images and a second camera is used to capture temporal sequences of digital images.

10. A method as defined in claim 9, wherein the cameras have substantially different sized fields of view.

11. A method as defined in claim 1, wherein a single camera is used to both obtain the first digital image and to capture the temporal sequence of digital images.

12. A method as defined in claim 1, wherein the operation of feeding back includes providing feedback directly on the text to be read.

13. A method as defined in claim 1, wherein the operation of feeding back includes providing feedback through an electronic display of at least a portion of the digital image.

14. A method as defined in claim 1, wherein a flatbed scanner is used to obtain digital images.

15. A method as defined in claim 1, wherein digital images are obtained from an internal computer video buffer of a screen image.

16. A method as defined in claim 1, wherein the spatial configurations of the pointer are determined from the interaction of a proximity-sensitive display with the pointer.

17. A method as defined in claim 1, wherein the act of obtaining digital images can be accomplished via an imaging device worn by the user.

18. A method as defined in claim 17, wherein the imaging device is incorporated into glasses worn by the user.

19. A method as defined in claim 1, including additionally displaying enhanced images of the text to the user.

20. A method as defined in claim 19, wherein the degree of enhancement is controlled by the user.

21. A method as defined in claim 20, wherein the degree of image enhancement is controlled by the command signal.

22. A method as defined in claim 19, wherein the image enhancement is a magnification of the text.

23. A method as defined in claim 19, wherein the image enhancement comprises affecting a property of the image chosen from the group consisting of contrast, brightness, bit-depth, and color polarity.

24. A method as defined in claim 1, including additionally providing the user feedback information about the layout of text within the digital image.

25. A method as defined in claim 1, wherein the spatial information is fed back via tactile information.

26. A method as defined in claim 25, wherein the tactile information is transduced by vibrating pins.

27. A method as defined in claim 25, wherein the tactile information is transduced by a force-feedback mouse.

28. A method as defined in claim 1, wherein the spatial information is fed back via visual information.

29. A method as defined in claim 28, wherein the visual information is displayed on the text using a laser scanner.

30. A method as defined in claim 1, wherein the spatial information is fed back via audible information.

31. An electronic reading apparatus for converting text to spoken words for a user, comprising:

a pointer that is operated by the user to indicate commands, wherein commands are encoded in the location and movement of the pointer relative to the text;

a digital imaging device that converts text to a digital imaging signal and which additionally captures a temporal sequence of digital images of the pointer, wherein the temporal sequence of images contains information about the location and movement of the pointer relative to the text;

a character recognizer receptive of the digital imaging signal, the recognizer generating a recognized character signal comprising the symbolic identity of the recognized text and the location of the recognized text relative to the digital imaging signal;

a pointer tracker that determines the pointer location and movement, the tracker generating a pointer location and movement signal relative to the text;

a command interpreter receptive of the pointer location and movement signal and the recognized character signal, the interpreter generating a command signal indicating the text to be converted to spoken words;

a feedback device receptive of the command signal, and providing feedback to the user about the location of the text to be converted to spoken words and the location of the pointer relative to recognized text;

a controller receptive of the command signal and the recognized character signal, the controller generating an output signal representative of at least portions of the text recognized; and a transducer receptive of the output signal for converting the output signal to speech.

32. A device as defined in claim 31, wherein the feedback device is additionally receptive of the recognized character signal and provides feedback to the user about the location of recognized text.

33. A method for electronically reading aloud text under interactive control by a user with a computer-based system, the method comprising:

obtaining a first image of at least a portion of the text and converting the image to a first signal representative thereof;

capturing a temporal sequence of images of at least one pointer under the control of the user and converting the temporal sequence of images to a second signal representative thereof;

supplying the first and second signals to the computer-based system;

performing symbology recognition on the first signal;

determining the position and movement of the pointer relative to the text from the first and second signals;

choosing a subset of the recognized symbology to read aloud on the basis of the determined position and movement of the pointer relative to the text and generating a command signal;

converting the chosen subset of recognized symbology into speech, additionally including providing feedback to the user of the particular subset of recognized symbology chosen and of the location of the pointer relative to the recognized symbology.

* * * * *